(12) United States Patent
Butina et al.

(10) Patent No.: US 12,479,319 B2
(45) Date of Patent: Nov. 25, 2025

(54) VEHICLE AUTO-CHARGING SYSTEM AND METHOD

(71) Applicant: Seegrid Corporation, Pittsburgh, PA (US)

(72) Inventors: Edward Butina, Coraopolis, PA (US); Justin Cole, Pittsburgh, PA (US); Jacob Seal, Pittsburgh, PA (US); Bruce Thompson, Pittsburgh, PA (US); Chun Zhang, Pittsburgh, PA (US); Dustin Yautz, Wexford, PA (US); Mitchell Weiss, Carlisle, MA (US)

(73) Assignee: Seegrid Corporation, Pittsburgh, PA (US)

( * ) Notice: Subject to any disclaimer, the term of this patent is extended or adjusted under 35 U.S.C. 154(b) by 0 days.

(21) Appl. No.: 18/748,777

(22) Filed: Jun. 20, 2024

(65) Prior Publication Data
US 2024/0336154 A1 Oct. 10, 2024

Related U.S. Application Data

(63) Continuation of application No. 18/392,274, filed on Dec. 21, 2023, now Pat. No. 12,221,000, which is a continuation of application No. 17/163,973, filed on Feb. 1, 2021, now Pat. No. 11,850,959.

(60) Provisional application No. 62/967,628, filed on Jan. 30, 2020.

(51) Int. Cl.
*B60L 53/16* (2019.01)
*H02J 7/00* (2006.01)

(52) U.S. Cl.
CPC ............ *B60L 53/16* (2019.02); *H02J 7/0047* (2013.01)

(58) Field of Classification Search
CPC .............................. B60L 53/16; H02J 7/0047
USPC .......................................................... 320/109
See application file for complete search history.

(56) References Cited

U.S. PATENT DOCUMENTS

| | | | |
|---|---|---|---|
| 6,157,162 A * | 12/2000 | Hayashi | H02J 7/0042 320/104 |
| 7,311,526 B2 | 12/2007 | Rohrbach et al. | |
| 8,288,989 B2 | 10/2012 | Baba | |
| 8,473,131 B2 | 6/2013 | Leary | |

(Continued)

FOREIGN PATENT DOCUMENTS

| | | |
|---|---|---|
| CH | 688599 | 11/1997 |
| CN | 101188319 | 5/2008 |

OTHER PUBLICATIONS

Extended European Search Report dated Feb. 21, 2024 issued in European Application No. 21747799.1.
(Continued)

*Primary Examiner* — Nathaniel R Pelton
(74) *Attorney, Agent, or Firm* — Onello & Mello, PC

(57) ABSTRACT

A vehicle charging system comprises at least one controller and at least one arm, each arm having a first end coupled to an actuator and a second end comprising a charging interface. The actuator is configured to articulate the arm into a charging position. The charging interface comprises at least one charging contact coupled to a power source and configured to engage and deliver power to a vehicle charging interface to charge at least one battery of a vehicle. The charging system can include a plurality of arms, each configured to charge a different vehicle. A method of charging one or more vehicles using the charging system is also provided.

18 Claims, 25 Drawing Sheets

(56) References Cited

U.S. PATENT DOCUMENTS

| | | |
|---|---|---|
| 9,431,182 B2 | 8/2016 | Kim et al. |
| 11,498,452 B2 | 11/2022 | O'Gorman et al. |
| 11,850,959 B2 | 12/2023 | Butina et al. |
| 2007/0072443 A1 | 3/2007 | Rohrbach et al. |
| 2010/0308769 A1 | 12/2010 | Baba |
| 2011/0074350 A1 | 3/2011 | Kocher |
| 2011/0077809 A1* | 3/2011 | Leary .................. B60L 53/14 |
| | | 320/109 |
| 2016/0006187 A1 | 1/2016 | Kim et al. |
| 2016/0016480 A1 | 1/2016 | Kim et al. |
| 2018/0189683 A1 | 7/2018 | Newman |
| 2018/0189686 A1 | 7/2018 | Díaz et al. |
| 2019/0025830 A1* | 1/2019 | O'Brien ................ B60L 53/36 |
| 2020/0290753 A1 | 9/2020 | Anastassacos et al. |
| 2021/0237596 A1 | 8/2021 | Butina et al. |

OTHER PUBLICATIONS

International Preliminary Report on Patentability dated Jan. 13, 2022 issued in International Application No. PCT/US2021/016010.
International Search Report and Written Opinion dated Jun. 9, 2021 issued in International Application No. PCT/US21/16010.

\* cited by examiner

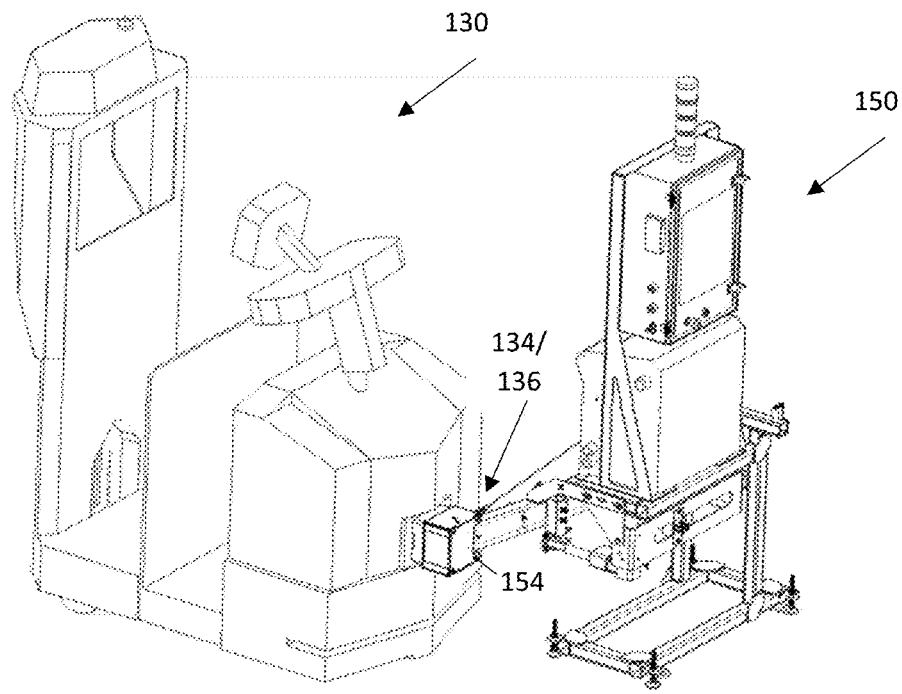
FIG. 7E
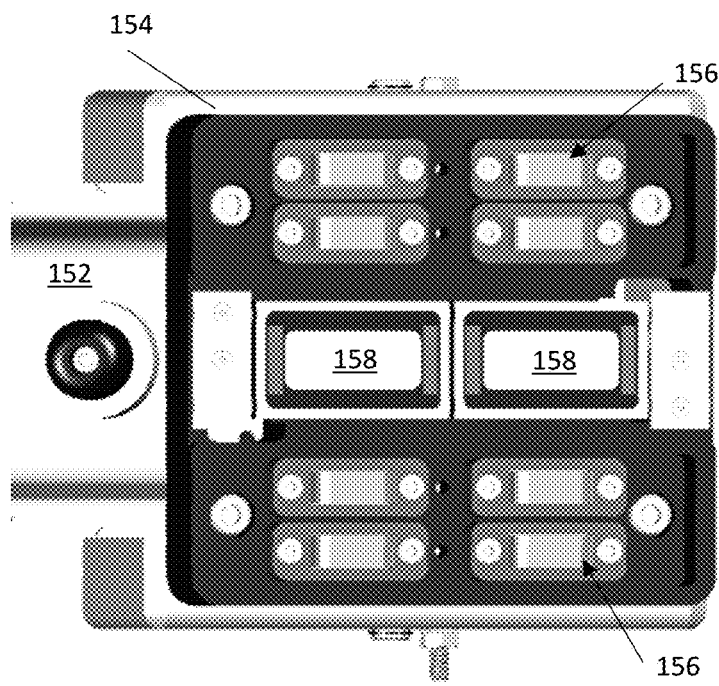 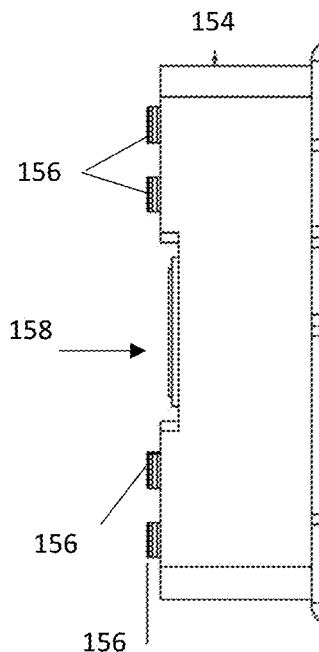
FIG. 8A     FIG. 8B

VEHICLE AUTO-CHARGING SYSTEM AND METHOD

RELATED APPLICATIONS

This application is a continuation of U.S. patent application Ser. No. 18/392,274, filed Dec. 21, 2023, entitled VEHICLE AUTO-CHARGING SYSTEM AND METHOD, which is a continuation of U.S. patent application Ser. No. 17/163,973, filed Feb. 1, 2021, entitled VEHICLE AUTO-CHARGING SYSTEM AND METHOD, now U.S. Pat. No. 11,850,959, issued Dec. 26, 2023, which claims benefit of U.S. Provisional Application No. 62/967,628, filed Jan. 30, 2020, and entitled VEHICLE AUTO-CHARGING SYSTEM AND METHOD, which is hereby incorporated by reference in its entirety.

FIELD OF INTEREST

The present inventive concepts relate to systems and methods in the field of battery-operated vehicles, and more particularly to systems and methods for auto-charging automated guided vehicles (AGVs).

BACKGROUND

Battery operated vehicles are becoming increasingly prevalent in society. At the same time, self-driving vehicles, autonomous vehicles, and automated guided vehicles (AGVs) are also increasingly being used in different ways. Beyond recreational drones for personal use, drones are also gaining use by commercial enterprises, e.g., for deliveries. Any of these vehicles could be battery operated vehicles, or battery operated AGVs.

There has been some experimentation with self-driving automobiles on the roadways, which is certain to continue. One environment where AGVs have become particularly useful is warehouse environments, e.g., environments that receive, store, and then transport goods. In such environments, the goods tend to be transient. Received goods are moved to storage locations in the environment, where they are temporarily stored awaiting subsequent disposition.

A storage facility is a facility primarily used for storage of goods for commercial purposes, such as a warehouse. The storage is generally intended to be temporary, as such goods ultimately may be intended for a retailer, consumer or customer, distributor, transporter or other subsequent receiver. A warehouse can be a standalone facility, or can be part of a multi-use facility. Thousands of types of items can be stored in a typical warehouse. The items can be small or large, individual or bulk. It is common to load items on a pallet for transportation, and the warehouse may use pallets as a manner of internally transporting and storing items.

A well-run warehouse is well-organized and maintains an accurate inventory of goods. Goods can come and go frequently, throughout the day, in a warehouse. In fact, some large and very busy warehouses work three shifts, continually moving goods throughout the warehouse as they are received or needed to fulfill orders. Shipping and receiving areas, which may be the same area, are the location(s) in the warehouse where large trucks pick-up and drop-off goods. The warehouse can also include a staging area—as an intermediate area between shipping and receiving and storage aisles within the warehouse where the goods are stored. The staging area, for example, can be used for confirming that all items on the shipping manifest were received in acceptable condition. The staging area can also be used to build orders and pallets to fulfill orders that are to be shipped.

Goods in a warehouse tend to be moved in one of two ways, either by pallet or by cart (or trailer). A pallet requires a pallet transport for movement, such as a pallet jack, pallet truck, forklift, or stacker. A stacker is a piece of equipment that is similar to a fork lift, but can raise the pallet to significantly greater heights, e.g., for loading a pallet on a warehouse shelf A cart requires a tugger (or "tow tractor"), which enables a user to pull the cart from place to place.

A pallet transport can be manual or motorized. A traditional pallet jack is a manually operated piece of equipment, as is a traditional stacker. When a pallet transport is motorized, it can take the form of a powered pallet jack, pallet truck, or forklift (or lift truck). A motorized stacker is referred to as a power stacker. A motorized pallet jack is referred to as a powered pallet jack, which an operator cannot ride, but walks beside. A pallet truck is similar to a powered pallet jack, but includes a place for an operator to stand.

As with motorized pallet transports, a tugger can be in the form of a drivable vehicle or in the form of a powered vehicle along the side of which the operator walks. In either form, a tugger includes a hitch that engages with a companion part on the cart, such as a sturdy and rigid ring or loop.

Various types of vehicles exist that can navigate without direct reliance on a human driver, such as autonomous mobile robots (AMRs), automatic guided vehicle (AGV), vision guided vehicles (VGV), and autonomous guided carts (AGCs), as examples. For purposes of brevity, such vehicles will be collectively referred to as AGVs. AGV forms of pallet trucks and powered tuggers exist. They are most often used in industrial applications to move materials around a manufacturing facility or a warehouse, such as in the case of AGV forklifts and AGV tuggers.

In the case of battery operated AGVs operating in an environment, e.g., a warehouse, it would be advantageous to provide auto-charging systems and methods that enable orchestrated and/or efficient charging of multiple AGVs, preferably without human assistance or intervention.

SUMMARY

In accordance with aspects of the inventive concepts, provided is a vehicle charging system. The system can comprise a charging interface having at least one magnet and at least one charger contact that is, optionally, compressible. The system can also include at least one controller operatively coupled to the at least one magnet and the at least one charger contact. The controller can be configured to turn on the magnet to couple the charger contact to a vehicle charging interface of a vehicle and, in response to compression of the charger contact, deliver a current to the coupled charging interface to initiate a charge cycle.

In various embodiments, the at least one controller includes a controller operatively coupled to the vehicle and configured to disable drive functions of the vehicle prior to initiating the charge cycle.

In various embodiments, the controller is operatively coupled to the vehicle is remote to the vehicle.

In various embodiments, the system further comprises a body or frame and at least one arm coupled to the body and operatively coupled to the at least one controller. The at least one controller is configured to articulate the at least one arm into a charging position in response to a charge cycle indication. And the at least one controller is configured to articulate the at least one arm into a non-charging position that clears the vehicle path in response to a charge cycle complete indication.

In various embodiments, the at least one arm is telescoping, foldable, and/or extendable. In various embodiments, the at least one arm is rotatable or swingable. In various embodiments, the at least one arm is configured for Z rotation and/or Y rotation.

In various embodiments, the at least one arm comprises a multi-bar linkage assembly. In various embodiments, the multi-bar linkage system is a four-bar linkage system.

In various embodiments, a first end of an arm is coupled to an actuator operatively coupled to the at least one controller and a second end of the arm includes the vehicle charging interface. In various embodiments, the actuator comprises a motor configured to articulate the arm.

In various embodiments, the system further comprises one or more sensors monitored by the at least one controller and configured to generate a vehicle detection signal indicating a presence and/or an absence of the vehicle.

In various embodiments, the one or more sensors includes at least one of a motion sensor, a pressure sensor, a camera, a light sensor, a sound sensor, a magnetic sensor, a load sensor, a vibration sensor, and/or a temperature sensor.

In various embodiments, the at least one controller is configured to cause the actuator to transition the arm between the non-charging position and the charging position and/or vice versa based on the vehicle detection signal.

In various embodiments, the charging interface further comprises at least one sensor arranged to detect a presence of the vehicle charging interface and the controller is configured to enable the at least one charger contact to engage and deliver power to the vehicle charging interface based on a detected vehicle charging interface.

In various embodiments, the charging interface is configured to extend the at least one charger contact to engage the detected vehicle charging interface.

In various embodiments, the charging interface is configured to retract the at least one charger contact to disengage a detected vehicle charging interface upon completion and/or termination of the charge cycle.

In various embodiments, the system further comprises one or more battery level detectors. In various embodiments, the at least one controller is configured to regulate power delivery to the vehicle charging interface based on a battery level detection of one or more batteries of the vehicle.

In various embodiments, the at least one controller is configured to terminate power delivery to the vehicle charging interface based on a determination that one or more batteries of the vehicle is fully charged.

In various embodiments, the at least one controller is configured to terminate power delivery to the vehicle charging interface based on a determination that one or more batteries of the vehicle is charged to a predetermined level. In various embodiments, the predetermined level is less than a full charge. In various embodiments, the predetermined level is about 80% of a full charge.

In various embodiments, the predetermined level is determined based on a remaining workload or schedule of the vehicle and/or other vehicles.

In various embodiments, the at least one controller is configured to initiate the charge cycle based on a battery level detection of one or more batteries of the vehicle having a charge level of about 50% or less.

In various embodiments, the compressible charger contact includes at least one biasing and/or shape memory element. In various embodiments, the compressible charger contact includes a spring element.

In various embodiments, the compressible charger contact is enabled to deliver the power to the vehicle charging interface once compressed a predetermined amount.

In various embodiments, the at least one controller is configured to turn off the magnet to magnetically disengage the compressible charger contact from the vehicle charging interface when charge cycle is completed.

In various embodiments, the system further comprises a body (or frame) and a plurality of arms coupled to the body, each arm operatively coupled to the at least one controller and having a magnet and a charging contact. The controller is configured to turn on each magnet to couple a respective charger contact to a vehicle charging interface of a vehicle and in response to compression of the charger contact, deliver a current to the coupled charging interface to initiate a charge cycle.

In various embodiments, the first arm and the second arm accommodate charging of vehicles oriented in parallel.

In various embodiments, the first arm and the second arm accommodate charging of vehicles oriented serially.

In various embodiments, the vehicle or vehicles includes an AGV.

In various embodiments, the AGV is a warehouse AGV, a self-driving automobile, or a drone.

In various embodiments, the warehouse AGV is a pallet truck, forklift, stacker, tugger, or carrier.

In various embodiments, the system is configured for vehicle drive-in, back-out charging.

In various embodiments, the system is configured for vehicle back-in, drive-out charging.

In various embodiments, the system is configured for vehicle drive-through charging.

In various embodiments, the system further comprises an artificial intelligence/machine learning module configured to monitor a plurality of vehicles and collect data of vehicle usage and battery consumption on the plurality of vehicles, and to formulate and/or adapt a charging schedule for the plurality of vehicles based on vehicle routes and predicted and/or actual power consumption of the vehicles.

In accordance with another aspect of the inventive concept, provided is a vehicle charging method. The method can comprise providing at least one charging station, each charging station configured to charge one or more AGVs. The method also includes and electronically orchestrating and organizing charging of the plurality of AGVs at the charging stations. This can include monitoring battery-related parameters of each of the plurality of AGVs and, based on the battery-related parameters, directing each of the plurality of AGVs to a charging station for charging. For an AGV, this can include directing the AGV to a charging location proximate to the charging station, optionally automatically disabling one or more onboard sensors of the AGV, directing the AGV to navigate into a charging area for charging, within the charging area, coupling a charging interface of the charging station to a vehicle charging interface of the AGV, and initiating a charge cycle that delivers power from the charging interface to the vehicle charging interface.

In accordance with another aspect of the inventive concept, provided is a vehicle charging method. The method comprises providing at least one charging station, each charging station configured to charge a plurality of AGVs and electronically orchestrating and organizing charging of the plurality of AGVs at the charging stations. This includes monitoring battery-related parameters of each of the plurality of AGVs and based on the battery-related parameters, directing each of the plurality of AGVs to a charging station for charging. For an AGV, this includes directing the AGV to a charging location proximate to the charging station, optionally automatically disabling one or more onboard sensors of the AGV, directing the AGV to navigate into a charging area for charging, within the charging area, coupling a charging interface of the charging station to a vehicle charging interface of the AGV, and initiating a charge cycle that delivers power from the charging interface to the vehicle charging interface.

In various embodiments, the method further comprises terminating the charge cycle, automatically decoupling the charging interface from the vehicle charging interface of the AGV, directing the AGV to navigate out of the charging area, and automatically re-enabling the disabled one or more onboard sensors.

In various embodiments, disabling the one or more onboard object sensors includes instructing the AGV to disable downward projecting scan planes.

In various embodiments, forward projecting scan planes of the AGV remain enabled when disabling the onboard object sensors.

In various embodiments, the forward projecting scan planes are horizontal scan planes that are substantially parallel to a ground plane, having a slope of not more than +/−10 degrees with respect to the ground plane.

In various embodiments, automatically coupling the charging interface of the charging station to the vehicle charging interface of the AGV is performed above the forward projecting scan planes.

In various embodiments, the coupling of the charging interface of the charging station to the vehicle charging interface of the AGV includes automatically articulating an arm of the charging station into a charging position, the arm having a first end coupled to an actuator and a second end comprising the charging interface.

In various embodiments, the charging interface couples to the vehicle charging interface at a front of the AGV.

In various embodiments, the charging interface couples to the vehicle charging interface at a side of the AGV.

In various embodiments, the charging interface comprises at least one magnet and at least one charger contact that is, optionally, compressible, and the coupling of the charging interface to the vehicle charging interface of the AGV comprises turning on the at least one magnet to couple the charger contact to the vehicle charging interface of the AGV.

In various embodiments, the method further comprises initiating the charge cycle in response to compression of the charger contact.

In various embodiments, the at least one charger contact is enabled to deliver the power to the vehicle charging interface in response to compression by a predetermined amount.

In various embodiments, the method further comprises terminating the charge cycle, including turning off the at least one magnet of the charging contact to decouple the at least one charger contact from the vehicle charging interface of the AGV.

In various embodiments, the at least one charger contact includes at least one biasing and/or shape memory element.

In various embodiments, the at least one charger contact includes a spring element.

In various embodiments, the method further comprises detecting engagement between the charging interface and/or the at least one charger contact and the vehicle charging interface by at least one sensor.

In various embodiments, the method further comprises providing a control system comprising one or more processors coordinating the steps performed by the at least one charging station and the plurality of AGVs.

In various embodiments, the control system includes at least one controller onboard one of more of the AGVs.

In various embodiments, the control system includes at least one controller forming part of one or more of the at least one charging stations.

In various embodiments, the control system is distributed, with portions of the control system forming part of one or more of the at least one charging station and portions of the control system onboard one or more of the AGVs.

In various embodiments, the control system is a warehouse management system (WMS) and the coordinating includes the WMS communicating with the at least one charging system and/or the plurality of AGVs.

In various embodiments, the method further comprises the control system coordinating the steps of a plurality of charging stations and of each of the plurality of AGVs.

In various embodiments, the method includes the control system monitoring utilization of the at least one charging station and of the plurality of AGVs, including monitoring the battery-related parameters, wherein the battery-related parameters include charge levels and/or locations of each of the plurality of AGVs and availability of the at least one charging station.

In various embodiments, the method further comprises detecting and/or monitoring a charge level of the AGV by at least one of the control system, the AGV, and/or the at least one charging station.

In various embodiments, the method further comprises the charging station and the AGV communicating via a short-range communication technology and performing at least some of the steps of auto-charging step based on the short-range communications.

In various embodiments, the method further comprises the AGV disabling the one or more onboard sensors in response to a communication from the charging station.

In various embodiments, the communication from the charging station includes a communication instructing or causing the AGV to enter the charging area.

In various embodiments, the method further comprises the AGV disabling the one or more onboard sensors in response to a detection by the AGV of the charging station.

In various embodiments, the method further comprises the AGV disabling the one or more onboard sensors based on a proximity or distance of the AGV to the charging station.

In various embodiments, the short-range communication technology is or includes Bluetooth technology.

In various embodiments, the AGV is a warehouse AGV.

In various embodiments, the warehouse AGV is a pallet truck, forklift, stacker, tugger, or carrier.

In various embodiments, the vehicle charging method includes the AGV driving into and backing out from the charging area.

In various embodiments, the vehicle charging method includes the AGV backing into and driving out from the charging area.

In various embodiments, the vehicle charging method includes the AGV driving through the charging area.

In various embodiments, the method further comprises monitoring the plurality of AGVs and collecting data for at least some of the battery-related parameters of the plurality of AGVs, the collected data including vehicle usage and battery consumption information and using an artificial intelligence/machine learning module, formulating and/or adapting a charging schedule for the plurality of AGVs based on the collected data, as well as routes and predicted and/or actual power consumption of the AGVs.

In accordance with aspects of the inventive concept, provided is a method of managing a plurality of AGVs. The method can comprise providing a management system in communication with a plurality of AGVs auto-navigating in an environment that has a plurality of charging stations, the management system monitoring and/or determining charge levels of the AGVs, the management system monitoring and/or determining availability of the charging stations, and the management system orchestrating charging of one or more of the AGVs by the plurality of charging stations based on the charge levels of the AGVs, current and/or future locations of the AGVs, locations of charging stations, and current and/or future availability of the charging stations.

In accordance with aspects of the inventive concept, provided is a method of managing a plurality of AGVs. The method comprises providing a management system in communication with a plurality of AGVs auto-navigating in an environment that has a plurality of charging stations, the management system monitoring and/or determining charge levels of the AGVs, the management system monitoring and/or determining availability of the charging stations, and the management system orchestrating charging of one or more of the AGVs by the plurality of charging stations based on the charge levels of the AGVs, current and/or future locations of the AGVs, locations of charging stations, and current and/or future availability of the charging stations.

In various embodiments, the method further comprises charging one or more AGVs at the charging stations, including selectively directing each of the plurality of AGVs to a charging station for charging. This process can include, for an AGV, directing the AGV to a charging location proximate to the charging station, automatically disabling one or more onboard sensors of the AGV, directing the AGV to navigate into a charging area for charging, within the charging area, coupling a charging interface of the charging station to a vehicle charging interface of the AGV, and initiating a charge cycle that delivers power from the charging interface to the vehicle charging interface.

In various embodiments, the method can include at least some of the AGVs following an ad hoc or event-driven route through the environment.

In various embodiments, the method further comprises the management system interrupting the ad hoc or event-driven route of an AGV to cause the AGV to navigate to a charging station and then, optionally, to resume the ad hoc or event-driven route after charging.

In various embodiments, the method further includes at least some of the AGVs following a pre-programmed route through the environment.

In various embodiments, the pre-programmed route of an AGV includes at least one designated area, pick zone and/or pick face where items are loaded on and/or unloaded from the AGV.

In various embodiments, the method further comprises the management system interrupting the pre-programmed route of the AGV to cause the AGV to navigate to a charging station and then, optionally, to resume the pre-programmed route after charging.

In various embodiments, the orchestrating is further based on the routes of the AGVs and the locations of the charging stations, such that interruption or delay of a route of one or more AGVs is minimized.

In various embodiments, the orchestrating is further based on the routes of the AGVs and the locations of the charging stations, such that throughput and/or efficiency of one or more AGVs is maximized.

In various embodiments, the orchestrating is further based on a present and/or future proximity of an AGV to a charging station, such that an AGV is directed to a closest available charging station during a present or future portion of its route.

In various embodiments, the orchestrating is further based on a present and/or future proximity of the AGVs to the charging stations, such that multiple AGVs are directed to different charging stations in a manner that avoids and/or minimizes contention for the same charging station by two or more AGVs.

In various embodiments, the orchestrating further includes directing an AGV to a charging station during an idle time of the AGV.

In various embodiments, the orchestrating further includes directing an AGV to a charging station after completion of a route or route segment by the AGV.

In various embodiments, the method further comprises the management system using artificial intelligence and/or machine learning to adapt charging of the AGVs by the charging stations based on one or more dynamically changing factors associated with the AGVs, the charging stations, and/or the environment. The factors can include locations of the AGVs, charge levels of the AGVs, and/or availability of the charging stations.

In various embodiments, the factors further include level of completion by one or more AGVs of a task list, request for subsequent utilization of at least one AGV, unplanned idle time of at least one AGV.

In various embodiments, the environment is a warehouse environment.

In various embodiments, the AGV is a pallet truck, stacker, tugger, or carrier.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. In the drawings:

FIGS. 7A-7E show different views of a drive-in charging station, in accordance with aspects of the inventive concepts;

FIG. 8A shows a front view of a charging interface of a charging station, FIG. 8B is a side view.

DESCRIPTION

Figure 1:
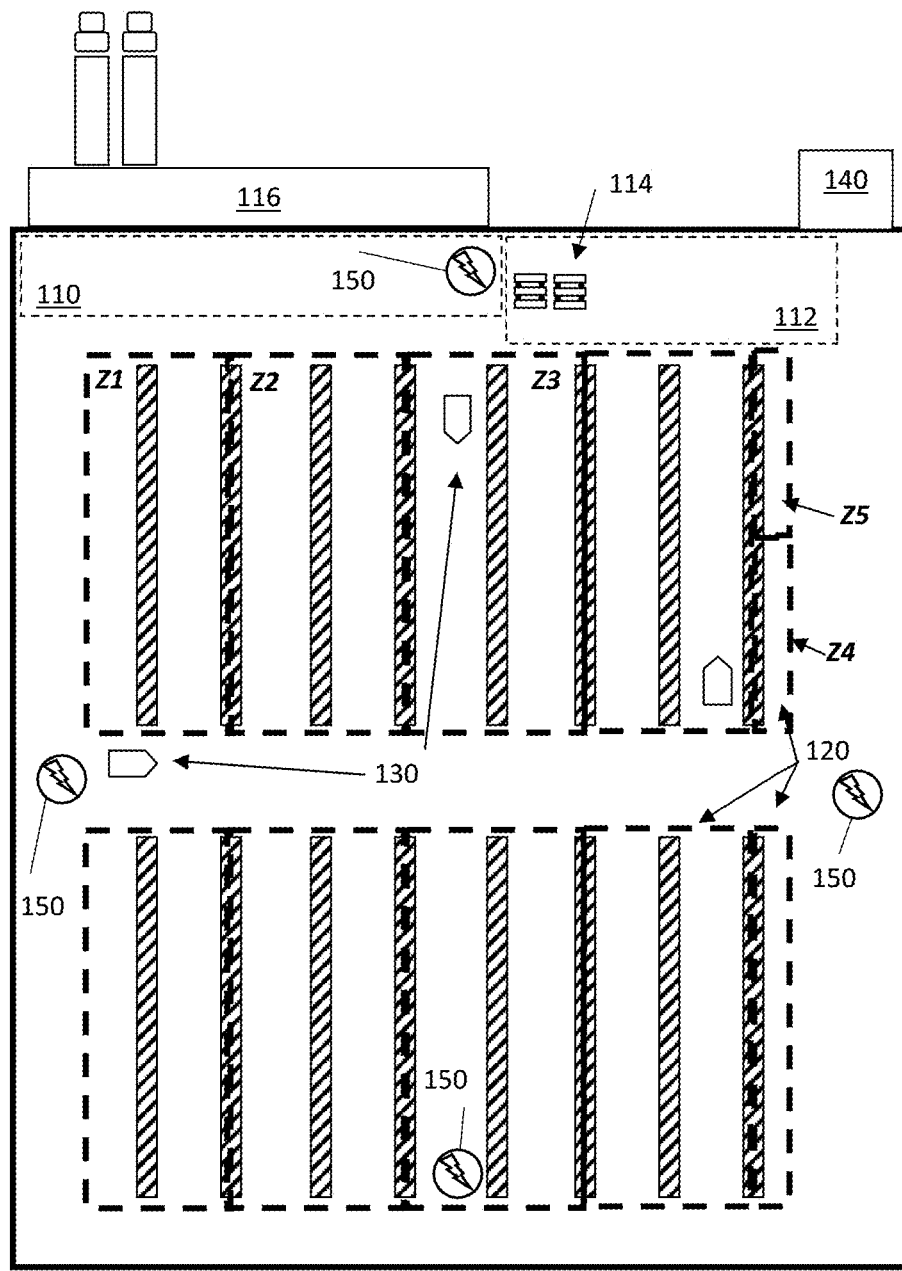
FIG. 1 is a block diagram of an embodiment of a warehouse comprising AGVs and charging stations, in accordance with aspects of the inventive concepts.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Referring to the figures, autonomous charging (or auto-charging) systems and methods in accordance with aspects of the inventive concept are provided. "Autonomous charging" or "auto-charging" is an umbrella term that can encompass some or all of the system modifications and method steps required and/or useful to charge a vehicle without an operator engaging with the vehicle. The term can include systems and methods that enable a vehicle (or external system in communication with the vehicle) to autonomously monitor charge level, schedule (or have scheduled for it) a charging task, navigate to and connect to a charge station, and return to the available production pool once sufficiently charged.

Systems and methods in accordance with aspects of the inventive concepts, can include or implement one or more of:

- Truck mounted assembly
- Facility mounted assembly
- Handle positional tolerances (+/−2" X, +/−3" Y)
- Physical connections between charging contacts and truck pads
- Depress contacts a determined amount to ensure electrical connection
- Avoid safety sensor field of vehicle
- Break electrical connection after charging
- Actuate range of motion, e.g., −90 degrees
- Ambidextrous Design, right, left, and/or multiples
- Robust construction built for warehouse ruggedness.

In a drive-in process, a drive-in charge station is physically designed for the vehicle to drive into and out of the charge station. For drive-in charging, preferably, the vehicle will be completely free from load. In a drive-thru process, a drive-thru charge station is physically designed for the vehicle to drive into and continue on its path out of the charge station. With the key distinction of driving through the station, this allows the truck to charge with a payload.

In accordance with aspects of the inventive concepts, in a direct charge process a charge station is located at a designated place, such as a battery area or other location that is not part of a planned route. Stations can be individual or grouped in a battery charge area. Generally, the vehicle will remain at the charge station until the battery is fully charged and then returned to service. Although, in some embodiments, a timed charge process and/or a charge interrupt can be possible. While a direct charge process can be used with a drive-in or drive-thru charge station type, this process might better lend itself to a drive-in charging station type.

In accordance with aspects of the inventive concepts, in an in-line charge process a charge station is located along the vehicle's route, which can be referred to as "opportunity charging." In various embodiments, such stations would likely be individually located along the vehicle's travel path at appropriate spots, such as locations to high traffic stops. To maximize operational efficiency, the desire is to put the station at a point on the route that requires the truck to stop for some period due to other operations (e.g., cart loading/unloading, taxi, wait) with the goal that it can charge sufficiently to run the route continuously. This requires the use of the drive-thru station type to enable the possibility of a load being attached to the truck. While an in-line charge process can be used with a drive-in or drive-thru charge station type, this process might better lend itself to a drive-thru charging station type.

FIG. 1 is a simplified diagram of a storage facility 100 in the form of a warehouse. Warehouse 100 includes a shipping & receiving area 110 and a staging area 112. A loading dock 116 may be provided, where goods can be loaded on and unloaded from trucks. In the staging area, pallets 114 are shown, and may be loaded with warehouse goods to fulfill an order. When a pallet 114 is loaded with goods, it can remain in the staging area 112 or shipping and receiving area 110 until it is ready for loading on a truck. In which case, the pallet 114 is moved to the shipping & receiving area 110 and then onto the truck.

Warehouse 100 includes a plurality of aisles and storage spaces (collectively aisles 120) where the goods are intended to be stored in an orderly manner. Additionally, zones can be defined in a warehouse—as a means for categorizing areas within a warehouse. A zone can be defined for an aisle, group of aisles, portion of an aisle, or various combinations thereof. In FIG. 1, several zones are defined, including zones Z1-Z5.

In various embodiments, one or more charging stations 150 in accordance with embodiments of the inventive concepts can be distributed around the warehouse to enable wireless charging of an AVG (e.g., VGV) or other vehicle. In some embodiments, the charging stations 150 can be static, e.g., installed in a fixed location. In other embodiments, one or more of the charging stations 150 can be moveable, so that they can be movable about the warehouse 100, e.g., moving to a location to meet a vehicle for charging. In various embodiments, one or more of the charging stations 150 can be a vehicle-based charging station that can be driven around the warehouse, or other environment. In various embodiments, an AGV 130 can include a charging station 150 and transport (or drive) itself to a vehicle charging area or vehicle in need of charge.

Figure 2:
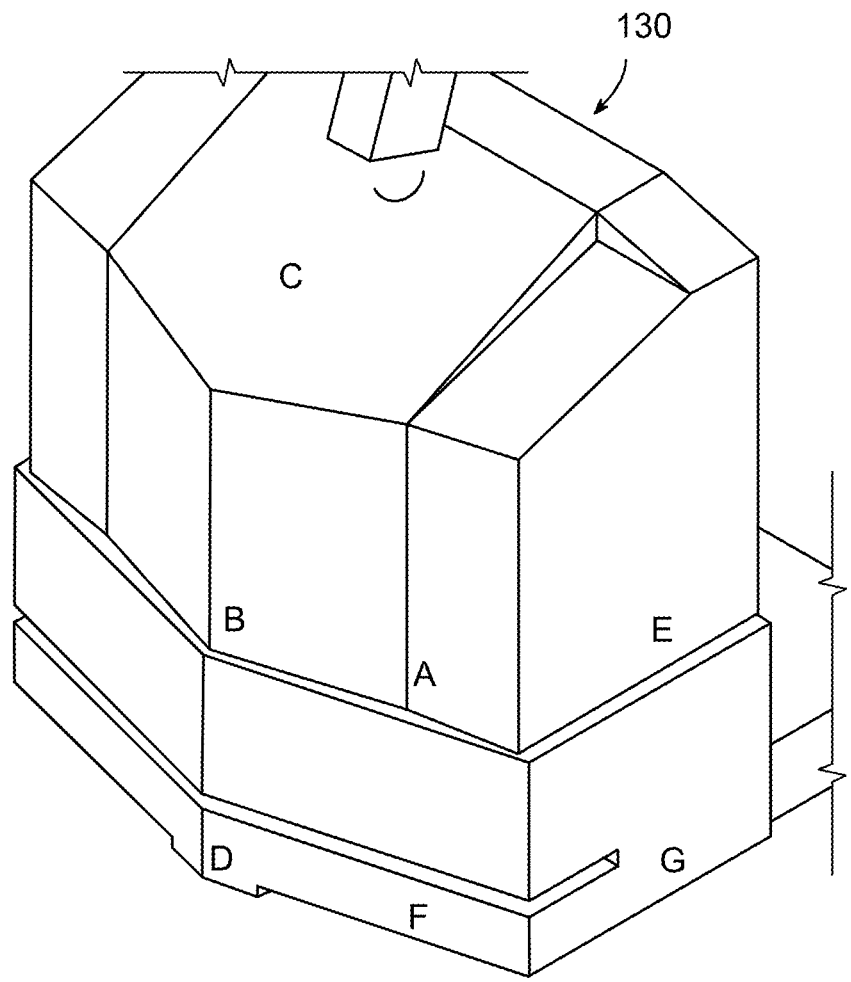
FIG. 2 shows embodiments of vehicle charging interface locations, in accordance with aspects of the inventive concepts.

FIG. 2 shows embodiments of possible vehicle charging interface locations on a vehicle 130, in accordance with aspects of the inventive concepts. The different exemplary locations are indicated by letters A through G, and represent examples of locations on a vehicle where one or more charging interfaces could be located. In various embodiments, a vehicle can have a plurality of different charging locations. The different charging locations can enable the vehicle to be charged by different charging station configurations, e.g., drive-in and drive-thru.

In FIG. 2, the different charging locations include: off-center front hood A, center front hood B, top hood C, under center front D, side of hood E, under off-center front F, and under side G. In other embodiments, other locations could be used, such as battery compartment (not shown) and top of a vehicle mast (not shown). In various embodiments, location B has been used, and accommodates ambidextrous charging, drive-in or drive-thru, e.g., from the right and left sides.

Figure 2A:
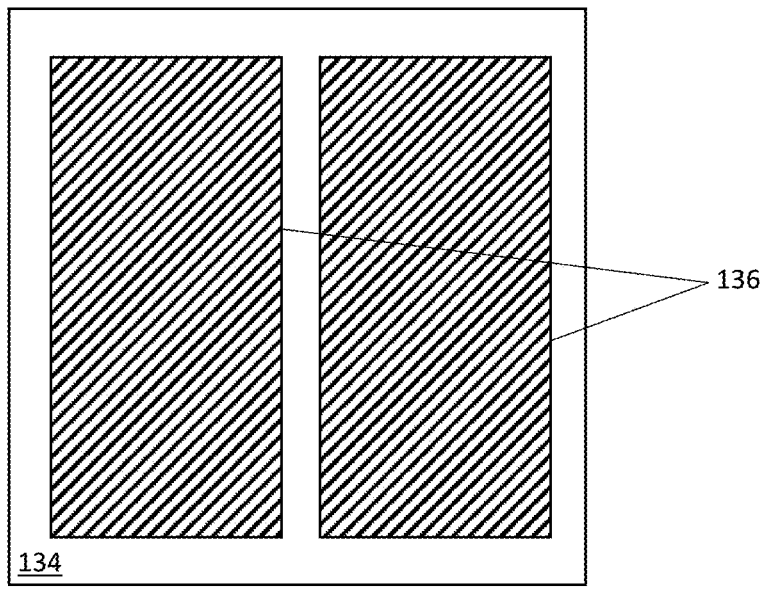
FIGS. 2A and 2B show embodiments of charging interface configurations, in accordance with aspects of the inventive concepts.
Figure 2B:
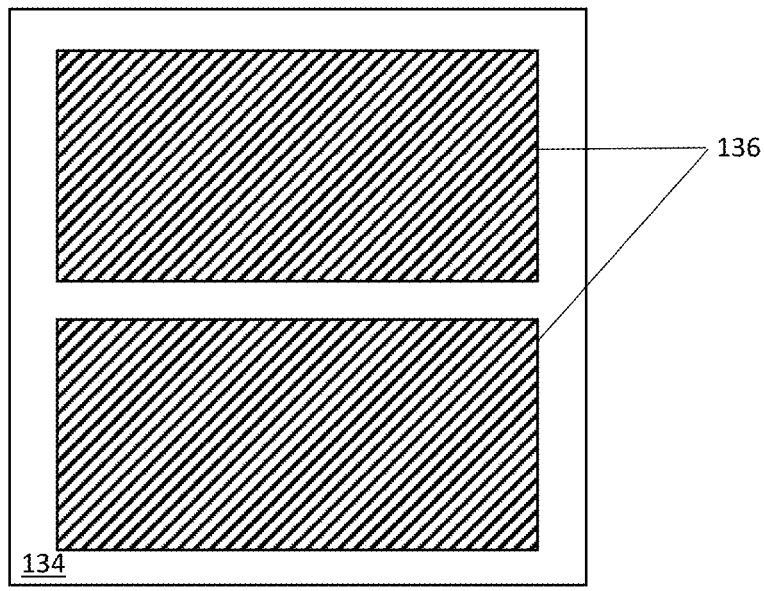

FIGS. 2A and 2B show embodiments of configurations of charger contacts 136 of a charging interface 134, in accordance with aspects of the inventive concepts. FIG. 2A shows two vertical charger contacts 136 and FIG. 2B shows two horizontal charger contacts 136. These charging interface configurations can be used on the vehicle, e.g., at locations A through G, as examples. In various embodiments, a charging head of a charging station includes a complementary charging interface.

Figure 3:
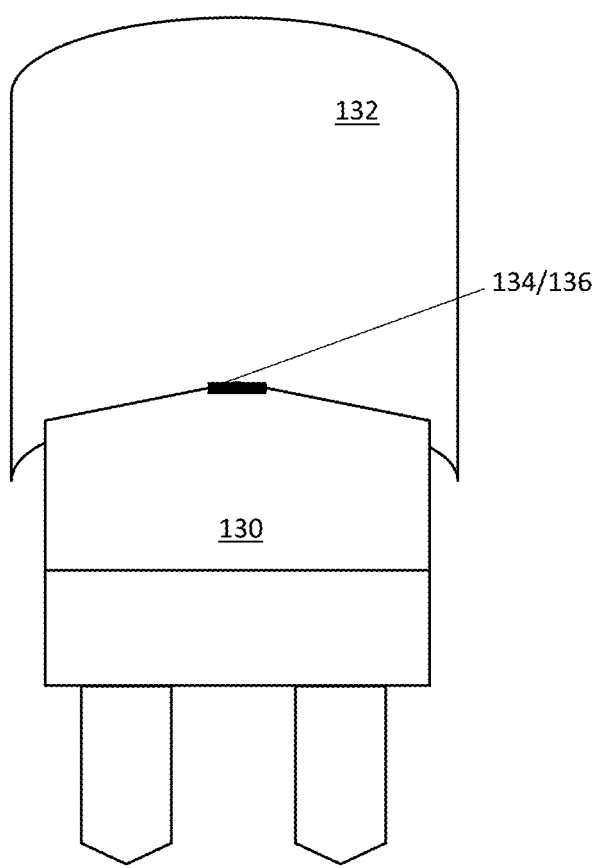
FIG. 3 shows an embodiment of a vehicle having a charging interface, in accordance with aspects of the inventive concepts.

FIG. 3 shows an embodiment of a vehicle 130 having a charging interface 134, which in turn includes at least one charger contact 136. In this embodiment, the charging interface is 134 are located at or proximate the center front hood B. AGVs, due to their autonomous nature, have sensors that play a critical role in vehicle safety and navigation. These safety sensors create and define "stop fields." When the safety sensors detect an object in the stop field, the drive system of the vehicle 132 stops the vehicle to avoid collision with the sensed object. Other sensors on the vehicle and generate scanning planes used for more general object avoidance and navigation. In various embodiments, the scanning planes can be muted or disabled once a vehicle is directed to and/or near a charging station for a charging operation.

In the embodiment of FIG. 3, vehicle 130 includes sensors (not shown) that form stop field 132. In order to get sufficiently close to the charging station 150 to engage in a charging operation, the vehicle 130 may temporarily disable its stop field 132 in some embodiments. Disabling the stop field may be controlled though communication between the vehicle 130 and the charging station 150 and/or warehouse management system 140, in various embodiments.

In various embodiments, the charging station is configured such that the vehicle need not mute or turn-off its stop field sensors. For example, a drive-thru charging station can be configured so that the charging station is offset from the drive path of the vehicle and is never present in the stop field as the vehicle travels through. Additionally, the charging arm of the charging station can extend into the drive path of the vehicle, above the stop field, so it is not detected. As another example, a drive-in charging station can be configured such that it is open at the bottom, so is not located in the stop field (or detected by the stop field sensors) when a vehicle approaches for charging.

Figure 4:
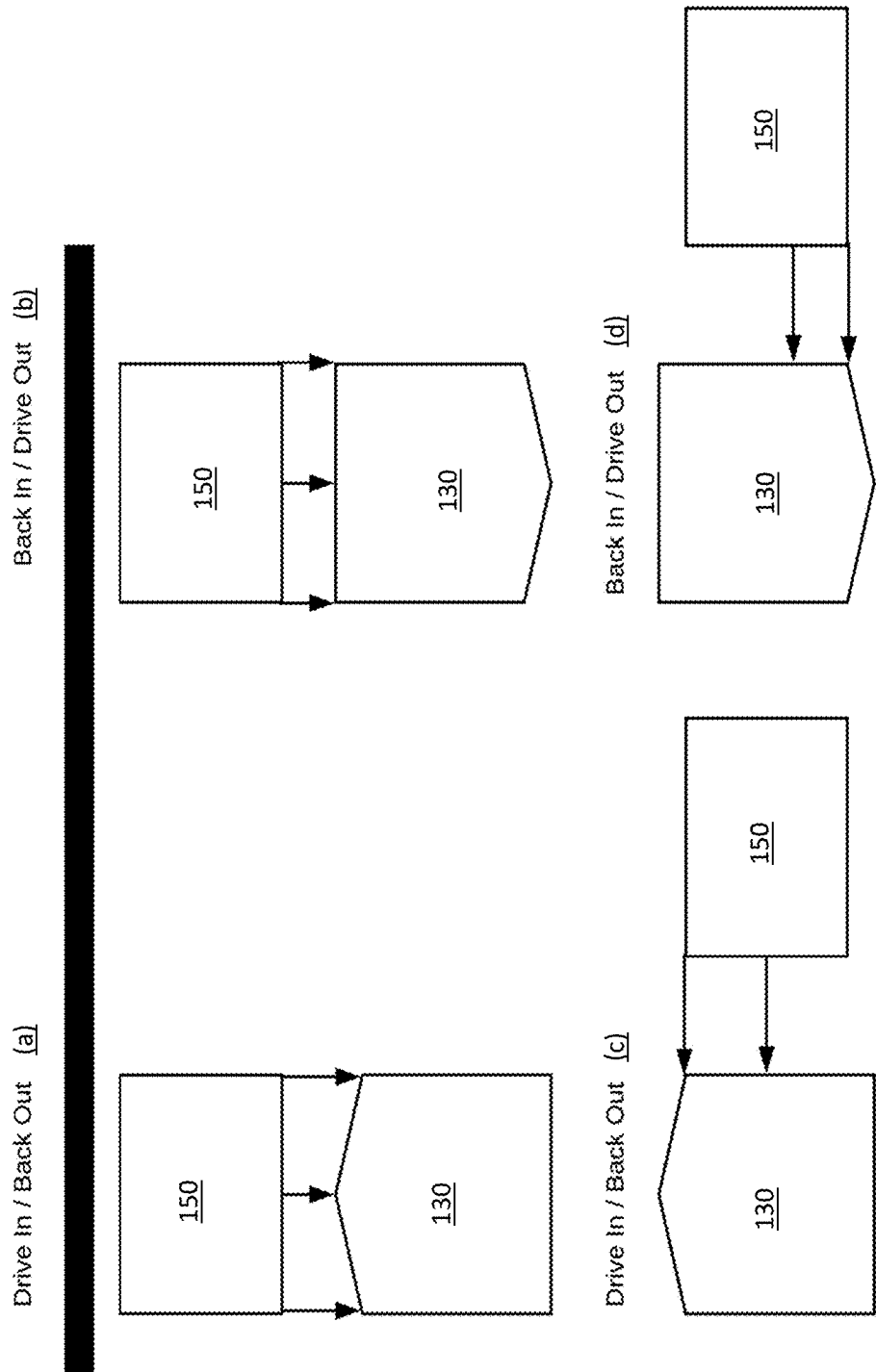
FIG. 4 shows embodiments of a drive-in charging arrangements, in accordance with aspects of the inventive concepts.

FIG. 4 shows embodiments of a drive-in charging arrangements, in accordance with aspects of the inventive concepts. FIG. 4 includes representative arrangements (a) through (d) of drive-in charging.

In representation (a), vehicle 130 has driven forward to engage the charging station 150. The figure shows three different examples of where charging contact between the charging station 150 and vehicle 130 could occur, indicated by the arrows. In this representation, the vehicle 130 would back out and away from the charging station 150 after charging.

In representation (b), vehicle 130 has driven backward to engage the charging station 150. The figure shows different examples of where charging contact between the charging station 150 and vehicle 130 could occur, indicated by the arrows. In this representation, the vehicle 130 would pull forward out and away from the charging station 150 after charging.

In representation (c), vehicle 130 has driven forward to engage the charging station 150. The charging station 150 can include an arm that extends latterly or rotate to engage the vehicle. The figure shows different examples of where charging contact between the charging station 150 and vehicle 130 could occur, indicated by the arrows. In this representation, the vehicle 130 would back out and away from the charging station 150 after charging.

In representation (d), vehicle 130 has driven backward to engage the charging station 150. The charging station 150 can include an arm that extends latterly or rotate to engage the vehicle. The figure shows different examples of where charging contact between the charging station 150 and vehicle 130 could occur, indicated by the arrows. In this representation, the vehicle 130 would pull forward out and away from the charging station 150 after charging.

Figure 5:
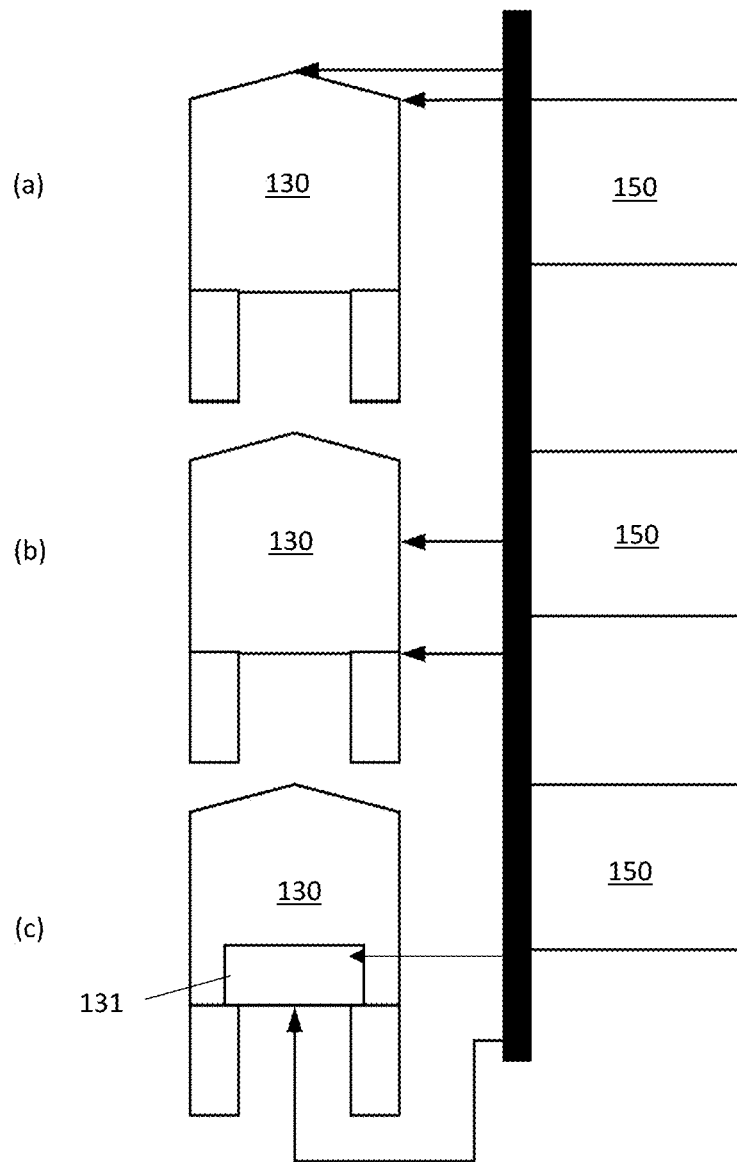
FIG. 5 shows embodiments of a drive-thru charging arrangements, in accordance with aspects of the inventive concepts.

FIG. 5 shows embodiments of a drive-thru charging arrangements, in accordance with aspects of the inventive concepts. FIG. 5 includes three representative arrangements, (a) through (c), of drive-thru charging. In these representations, the charging stations are to the right of the vehicle 130 with respect to the vehicle's forward travel direction, but in other embodiments the charging stations could be on the left side. As will be appreciated from this disclosure, in drive-thru charging, the charging station includes an arm that has a non-charging position where it does not obstruct a vehicle path and charging position where the arm extends into the vehicle path. The arm can transition from the non-charging position to the charging position by extending, rotating, pivoting, telescoping, or other mechanism. The arm can extend latterly or rotate to engage the vehicle charging interface.

In representation (a), vehicle 130 has driven forward to engage the charging station 150, which is to the right of the vehicle. The figure shows different examples of where charging contact between the charging station 150 and vehicle 130 could occur, indicated by the arrows. The charging contact can be at the top, front, and/or under the vehicle. In one embodiment, the charging contact is at a front center location B/D. In another embodiment, the charging contact is at an off-center front location A/F. In this representation, the vehicle 130 would drive forward and away from the charging station 150 after charging.

In representation (b), vehicle 130 has driven forward to engage the charging station 150, which is to the right of the vehicle. The figure shows different examples of where charging contact between the charging station 150 and vehicle 130 could occur, indicated by the arrows. The charging contact can be at the side and/or under the vehicle. In one embodiment, the charging contact is at a side of the hood location E/G. In another embodiment, the charging contact is at battery compartment, rearward of the hood. In this representation, the vehicle 130 would drive forward and away from the charging station 150 after charging.

In representation (c), vehicle 130 has driven forward to engage the charging station 150, which is to the right of the vehicle. The charging station 150 can include an arm that extends latterly to engage the vehicle. The figure shows two different examples of where charging contact between the charging station 150 and vehicle 130 could occur, indicated by the arrows. The charging contact can be at the rear and/or under the vehicle or at the top of the vehicle. In one embodiment, the charging contact is at a rear of a battery compartment, rearward of the hood. In another embodiment, the vehicle includes a mast 131 and the charging contact as at the mast. In this representation, the vehicle 130 would drive forward and away from the charging station 150 after charging.

Figure 6:
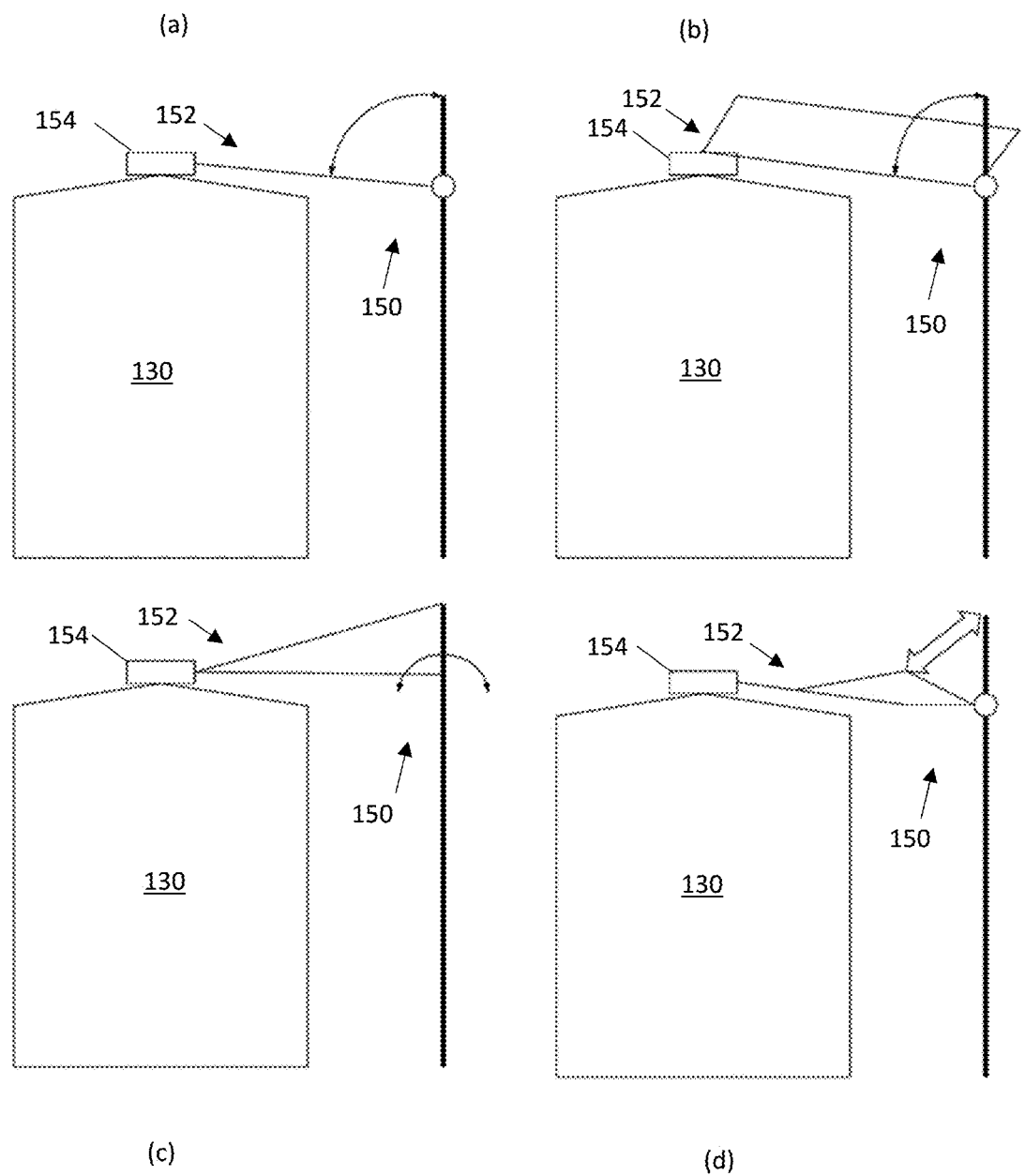
FIG. 6 shows arm embodiments of a drive-thru charging station, in accordance with aspects of the inventive concepts.

FIG. 6 shows arm embodiments of a drive-thru charging station 150, in accordance with aspects of the inventive concepts. The figure includes representations (a) though (d), each showing a different configuration and actuation method for transitioning the arm 152 of the charging station 150 into a charging position. At the distal charging end of the arm 152 is the vehicle charging interface (or charging head) 154. The charging interface 154 includes one or more charger contacts 156 not visible in this figure.

In representation (a), the arm 152 experiences a rotation to transition to the charging position. The arm can, therefore, be or include a rigid member to form a rigid, rotatable or swingable arm. The axis of rotation can be, for example, a z-axis of rotation. The charging station 150 can include an active or passive actuator to move the arm into and/or out of the charging position, such as a motor and/or extension spring.

In representation (b), the arm 152 is a four-bar linkage, comprising four rigid bars linked together to form a parallelogram. The charging station 150 can include an active or passive actuator to move the arm into and/or out of the charging position, such as a motor and/or compression spring, as examples.

In representation (c), the arm 152 experiences a rotation to transition to the charging position. The arm can, therefore, be or include a rigid member to form a rigid, rotatable or swingable arm. The axis of rotation can be, for example, a y-axis of rotation. The arm can include a cable or other member extending form the charging station 150 and coupling to a distal end of the arm, e.g., at the charging head 154, that facilitates rotation of the arm into and/or out of the charging position. The charging station 150 can include an active or passive actuator to move the arm into and/or out of the charging position, such as a motor or extension spring.

In representation (d), the arm 152 is a four-bar linkage, comprising four rigid bars linked together. The charging station 150 can include an active or passive actuator to move the arm into and/or out of the charging position, such as a motor and/or compression spring, as examples.

FIGS. 7A-7E show different views of a drive-in charging station, in accordance with aspects of the inventive concepts. In this embodiment, the vehicle to be charged has a charging interface 134 and charger contact(s) 136 at a front center of the vehicle.

In the embodiment, the charging station 150 includes frame 180 which provides the overall structure and form of the charging station. In this embodiment, the charging station can include a light stack 182 having a plurality of different color bands indicating different states of the charging station or environment. The charging station can include one or more floor mounts 184 to secure the charging station to a floor surface, ground surface, or other surface. The frame 180 can define a void 186 at its bottom. The void can be formed such that a stop field of a vehicle will project through the void 186 without detecting an object. This enables the vehicle to pull close enough to the charging station so that the charging interface 154 of the arm 152 can engage with charging interface 154 of the vehicle 150, without disabling safety sensors.

A controller or controller unit 160 is mounted and/or maintained within the frame 180. The controller 160 can have a voltage rating of 120 VAC, a current rating of 15 Amps and a connector specification of 120 VAC/15A. The controller 160 includes the controlling logic used to operate the charging station and control the arm. For example, the controller can include a programmable logic controller (PLC) that is configured to communicate with the vehicle 150, warehouse management system 140, or other system necessary or useful for controlling and/or monitoring charging.

A charger 170 is also mounted to and/or maintained within the frame 180. The charger can be an intelligent charger with the ability to detect when the device (battery) being charged is fully charged. The charger can have a voltage rating of 208 VAC, 3 phase, a current rating of 44.4 Amps with a connector specification of 250 VAC, 50 A, 3 phase. The charger can be, for example, an EnerSys charger.

The charging station 150 also includes an arm 152 attached to the frame 180 by a hinge 151. In this embodiment, the arm can rotate or swing out from a non-charging position to a charging position. The charging station can include an arm controller, e.g., an electro-mechanical actuator 159, used to move the arm 152 into an out of its charging position. The actuator is controlled by the controller 160.

In this embodiment, the arm 152 is a swing arm having a proximal end rotatably hinged by hinge 151 to the frame 180, under control by the controller 160. A cable 153 can used to bias or return the arm 152 to its non-charging position. Additionally, or alternatively, cables 153 can be used to support the arm, e.g., maintain the arm in its plane. One or more power cables 155 can extend from the charger 170 to the charging interface 154 and charger contacts 156. The power cables 155 can extend along and/or through arm 152. The arm 152 can include a conduit or retaining members (e.g., eyelets) to maintain the cables 155 in the arm 152.

In various embodiments, the arm 152 may be rotatable up to about 20 degrees such that it meets and engages the vehicle charging interface 134 after the vehicle 130 has stopped. The controller 160 and actuator 159 can continue to rotate the arm 152 for a small degree after initial contact between the vehicle interface 134 and the charging interface 154 of the arm 152 and stop once engagement is complete for charging. For example, in some embodiments, the actuator and controller can stop rotating the arm once the charger contacts 156 are sufficiently compressed. Once the charger 170 detects charge complete, the controller 160 disengages the interfaces 134/154.

Figure 7A:
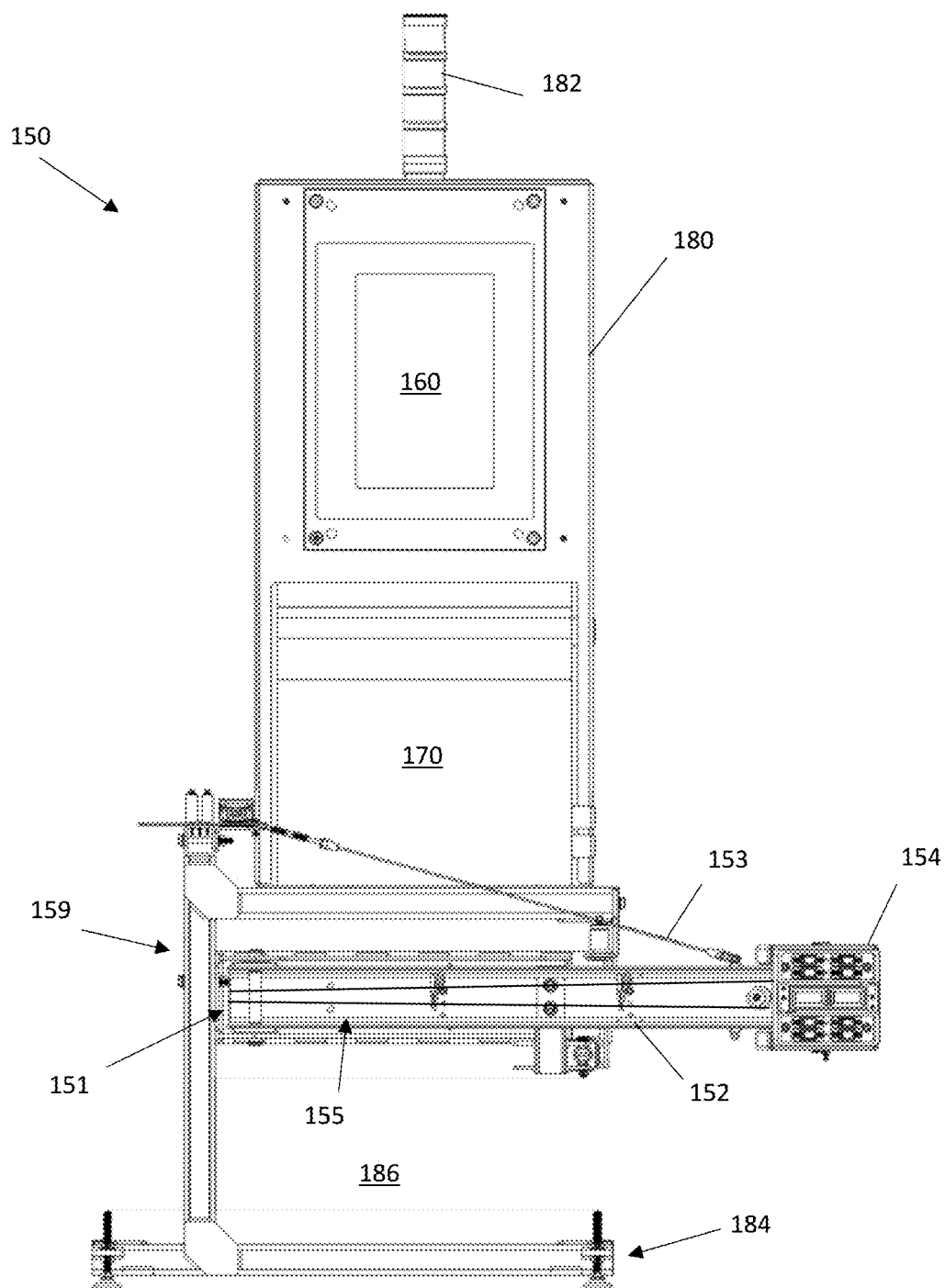
Figure 7B:
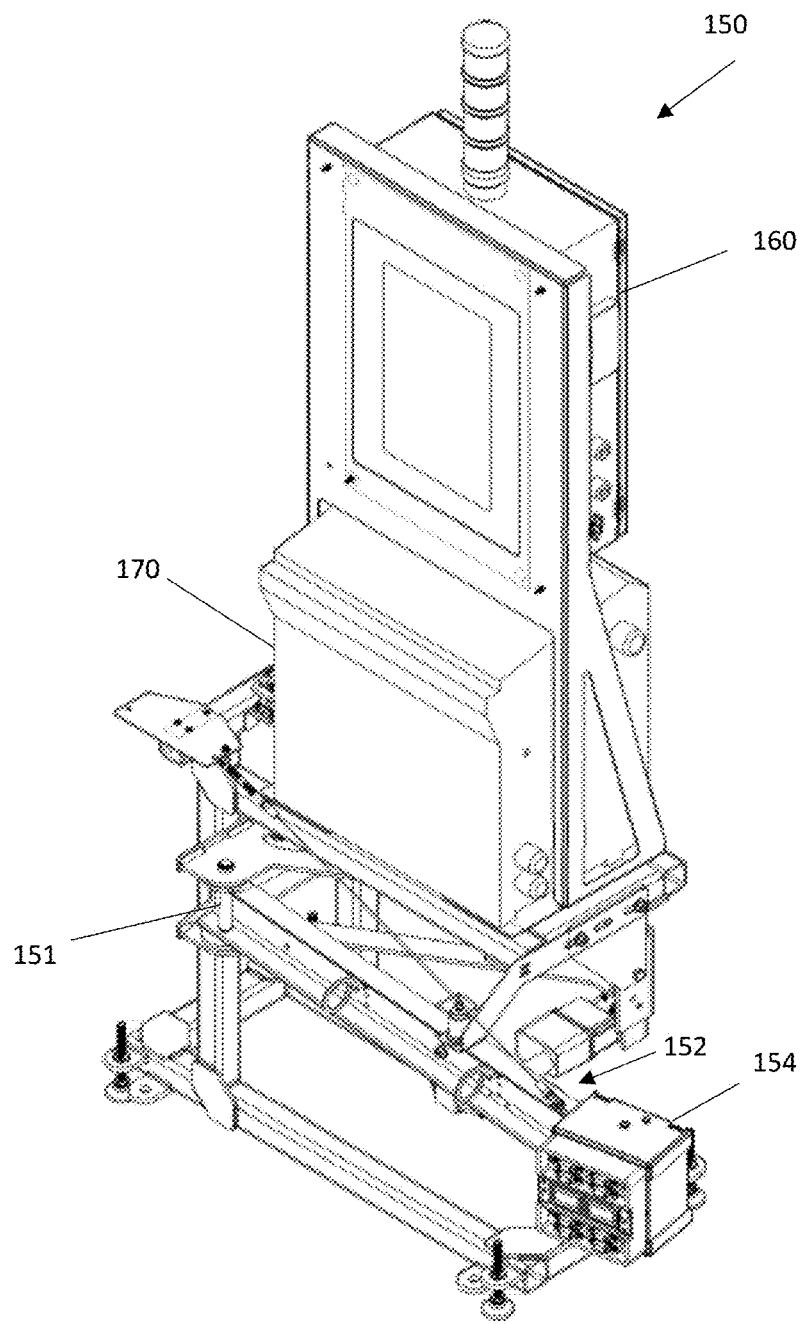
Figure 7C:
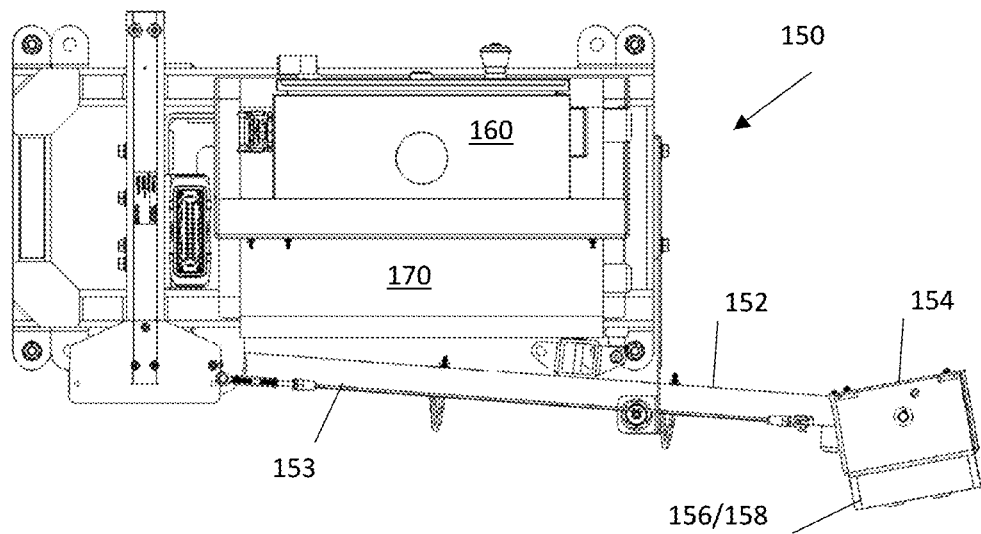
Figure 7D:
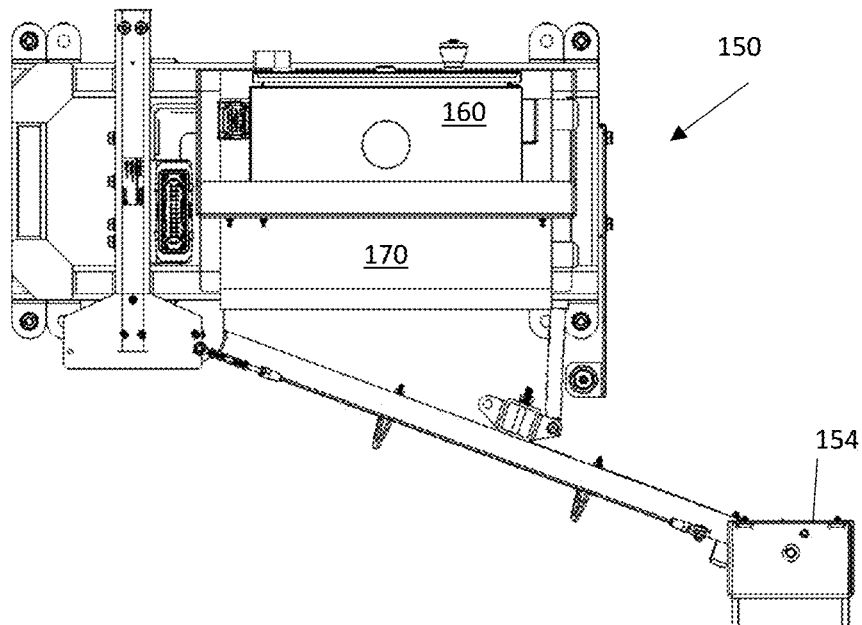

FIG. 7C shows the arm in its non-charging position and FIG. 7D shows the arm in its charging position. FIG. 7E shows a vehicle 130 having a charging interface 134 engaged by the charging interface 154 of the charging station 150.

FIG. 8A shows a front view of a charging interface 154 of a charging station 150, in accordance with aspects of the inventive concepts. One or more magnets 158 are centrally located in the charging interface 154. In this embodiment, two sets of charger contacts 156 are also included, one set on each side of the magnets 158. In this embodiment, the charger contacts 156 are oriented horizontally, e.g., to engage the charger contacts 136 of the vehicle, e.g., as in FIG. 2B. FIG. 8B is a side view, that shows that the compressible charger contacts 156 protrude from the charging interface 154 beyond the magnets 158.

Figure 8C:
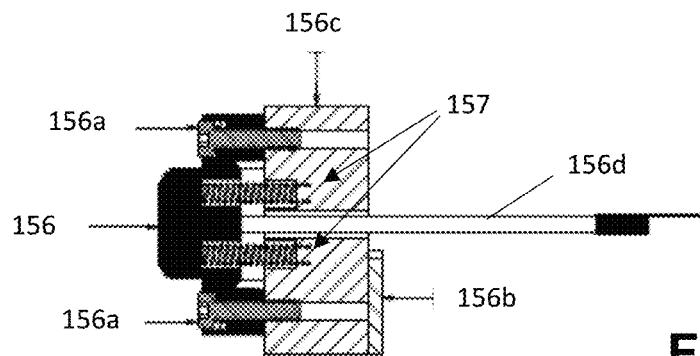
FIG. 8C shows an embodiment of portions thereof, in accordance with aspects of the inventive concepts.

FIG. 8C shows a portion of the charging interface 154 and, in particular, elements related to an embodiment of the compressible charger contacts 156. As is shown, a charger contact 156 is mounted to a collector base 156c of the interface 154 with screws 156a. The contact 156 itself is supported by a plurality of springs 157 that make the contact 156 compressible. The components are maintained within and coupled to the charging head 156b (or frame) of the interface 154. Once compressed, charging connection is established between the charger contact 156 and the collector base 156c and current can be delivered via the charging lead 156d to commence a charge cycle.

Figure 9A:
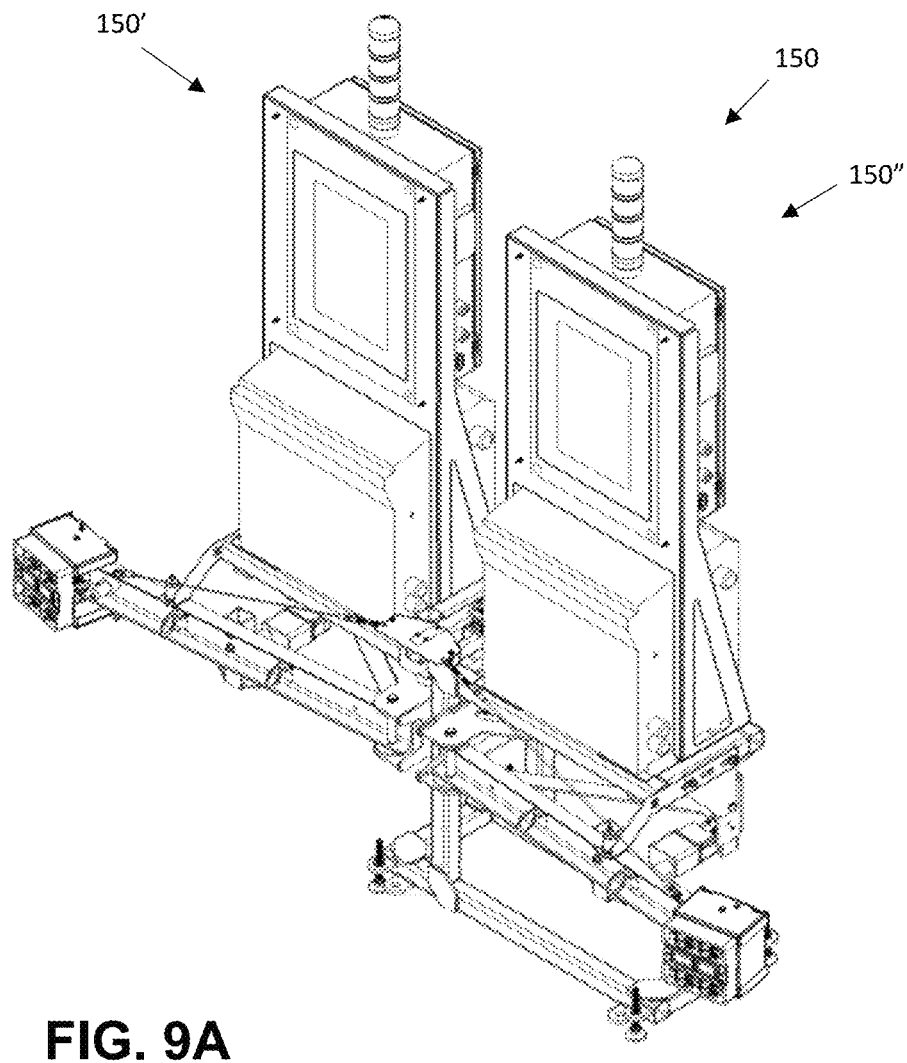
FIGS. 9A and 9B show different views of a double drive-in charging station, in accordance with aspects of the inventive concepts.
Figure 9B:
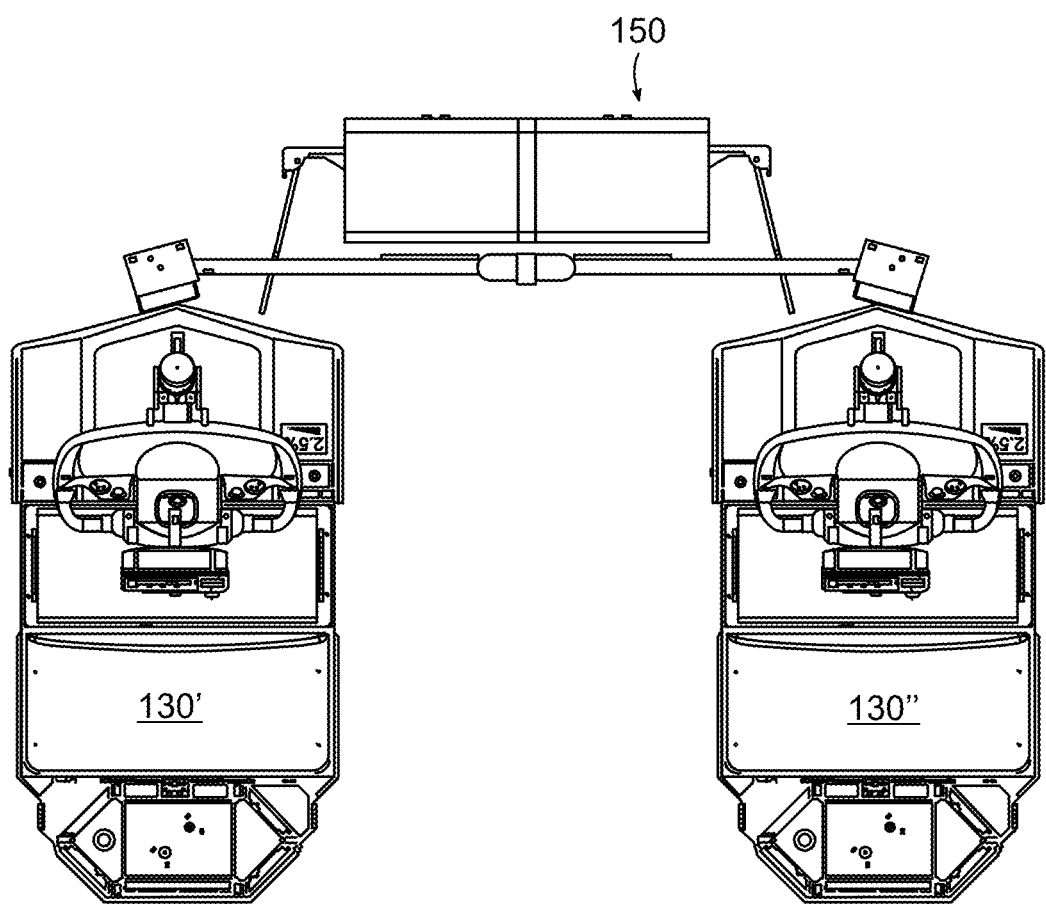
Figure 10A:
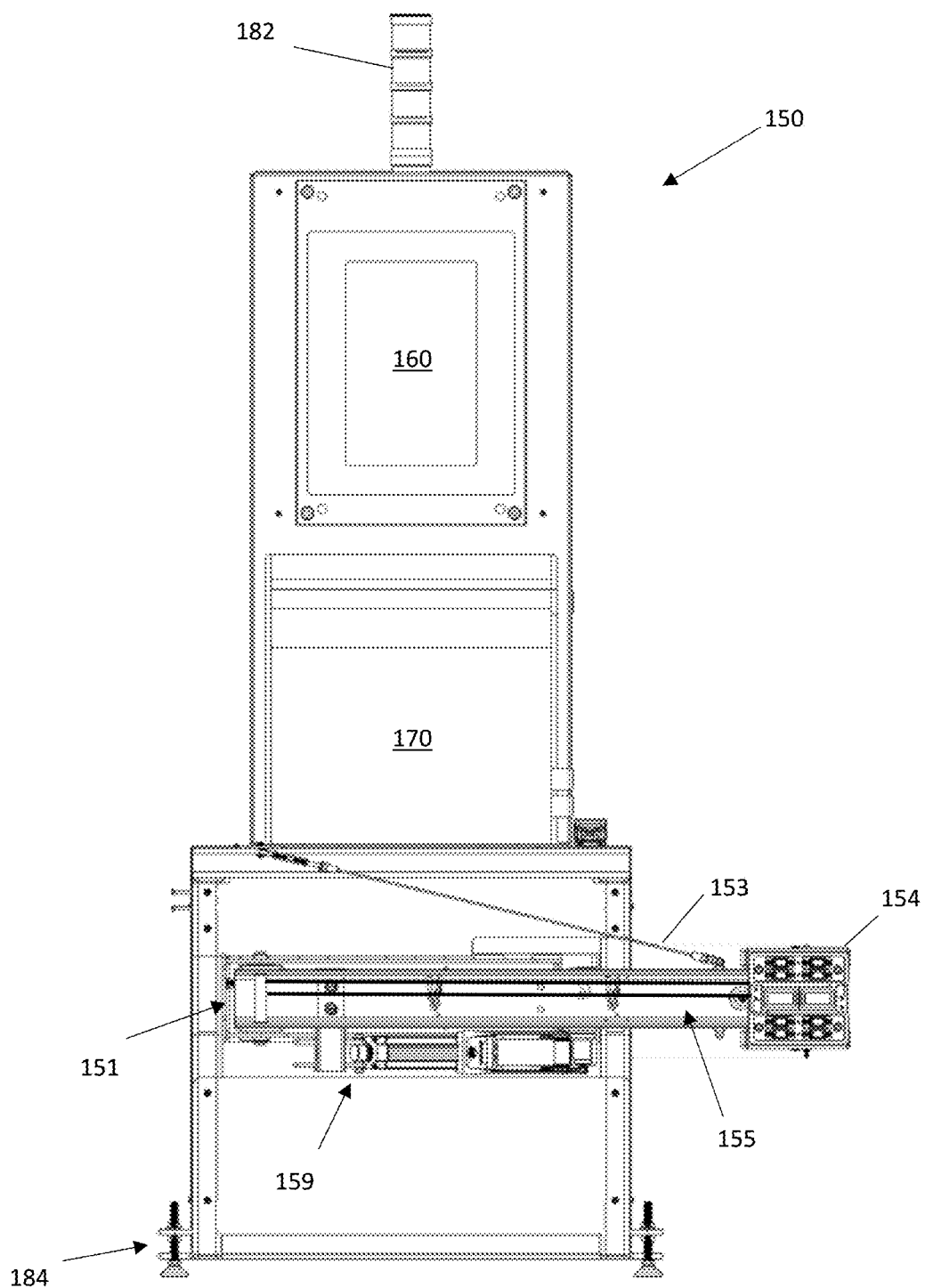
FIGS. 10A-10D show different views of a drive-thru charging station, in accordance with aspects of the inventive concepts.
Figure 10B:
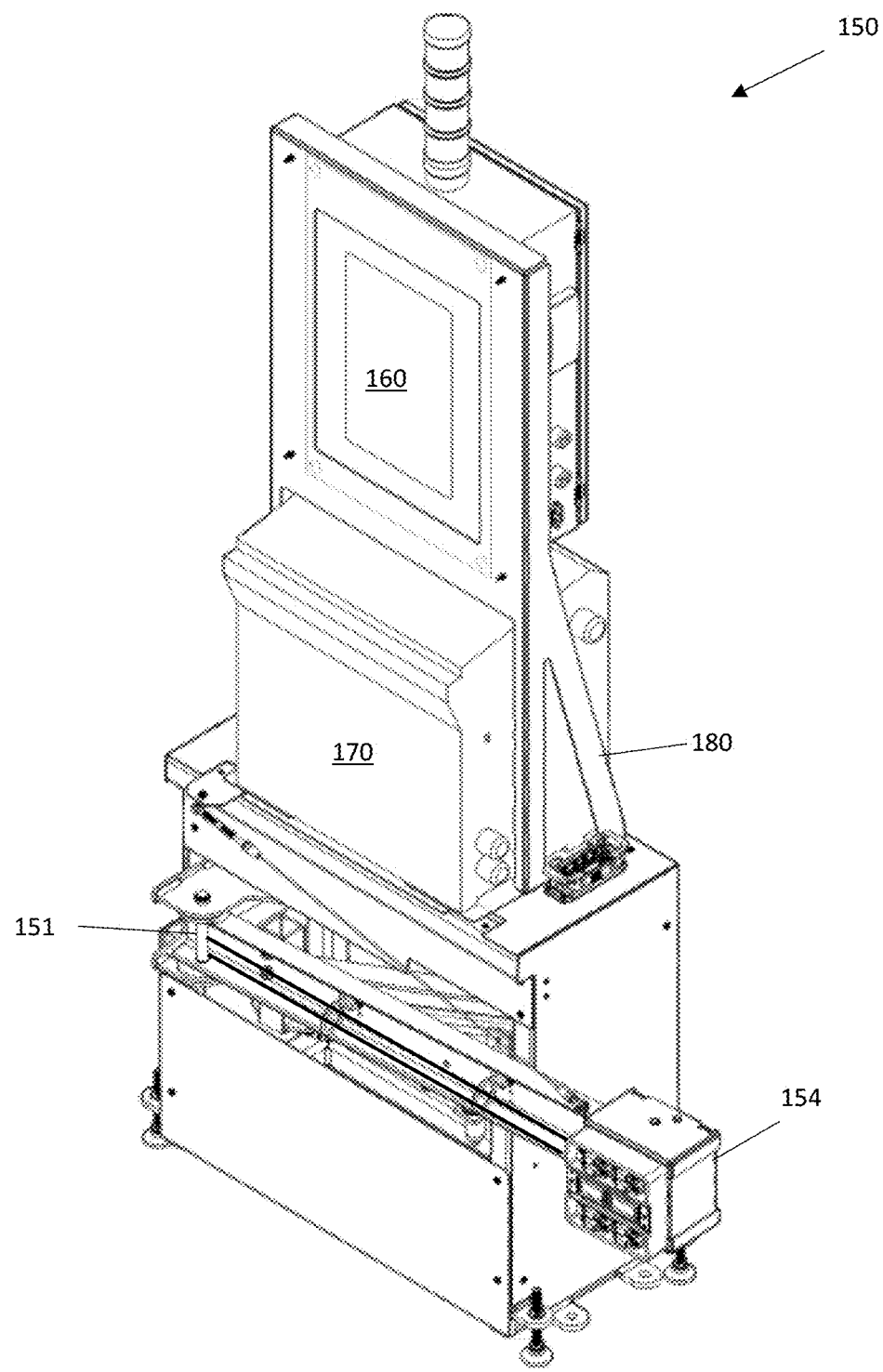
Figure 10C:
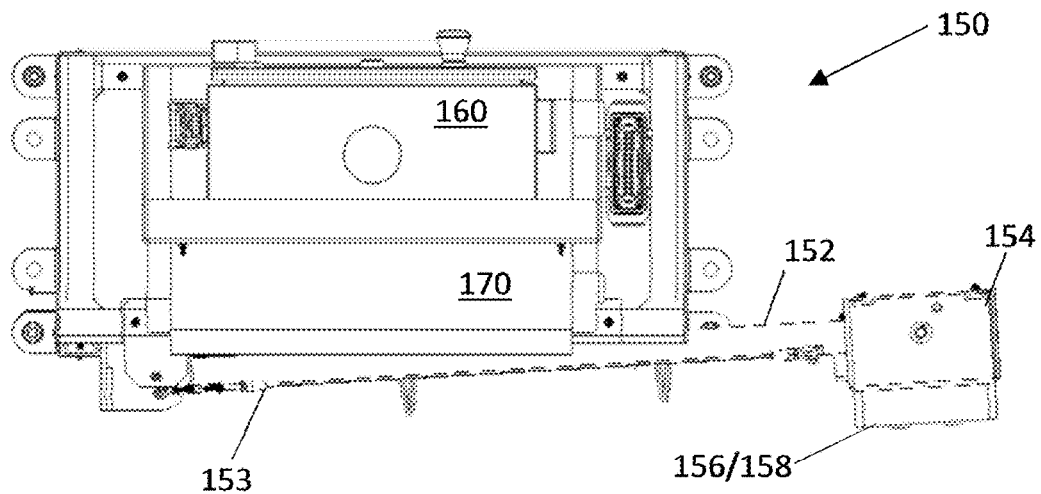
Figure 10D:
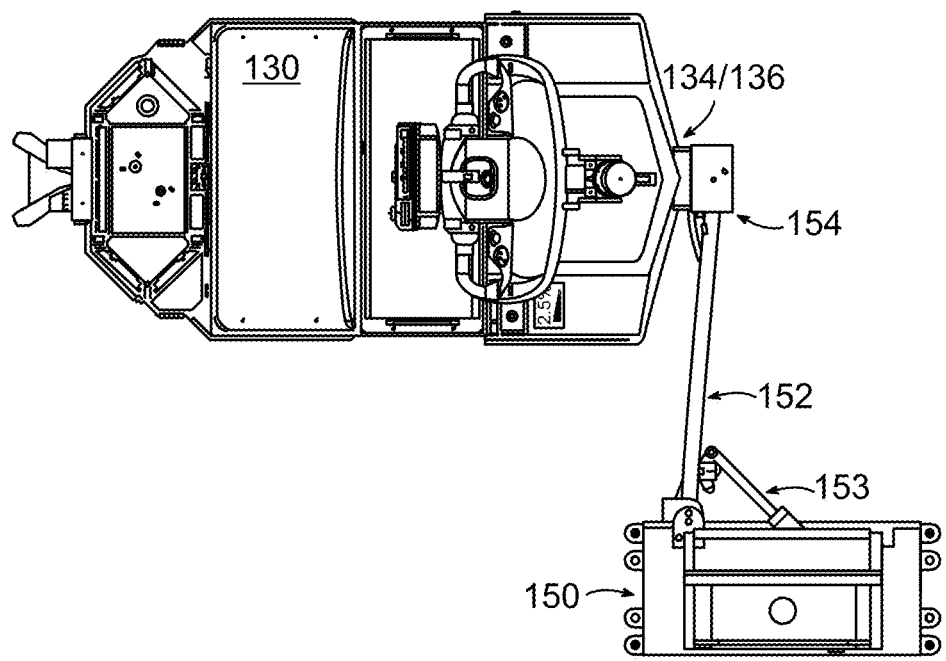

FIGS. 9A and 9B show different views of a double drive-in charging station, in accordance with aspects of the inventive concepts. In this embodiments, two charging stations 150' and 150" are located side-by-side to simultaneously charge two different vehicles 130' and 103".

FIGS. 10A-10D show different views of a drive-thru charging station, in accordance with aspects of the inventive concepts. In this embodiment, the vehicle being charged has a charging interface 134 and charger contacts 136 at a front center of the vehicle.

Since the charging station 150 is not in the stop field, the vehicle 130 can proceed into a charging position without muting or turning off the stop field safety sensors. And there is no need for a void to be defined in the frame 180 at its bottom.

In the drive-thru embodiment, the arm 152 in a non-charging position is maintained close to the charging station frame 180 and out of the vehicle's travel path. The arm can be maintained parallel the vehicle travel path when in the non-charging position. The actuators 159 are used to rotate the arm by about 90 degrees to put the arm in the charging position to engage the vehicle charging interface 134. As with the drive-in embodiments, the controller 160 and actuator 159 can continue to rotate the arm 152 for a small degree after initial contact between the vehicle interface 134 and the charging interface 154 of the arm 152 and stop once engagement is complete for charging, and the charger contact 156 are compressed. Once the charger 170 detects charge complete, the controller 160 disengages the interfaces 134/154 and the arm 152 returns to the non-charging position and out of the travel path.

In this embodiment, the arm is hinged 151 at a front portion of the charging station 150 and rotates toward the vehicle from the substantially parallel non-charging position to the charging position, e.g., substantially orthogonal or crosswise to the travel path.

Figure 11:
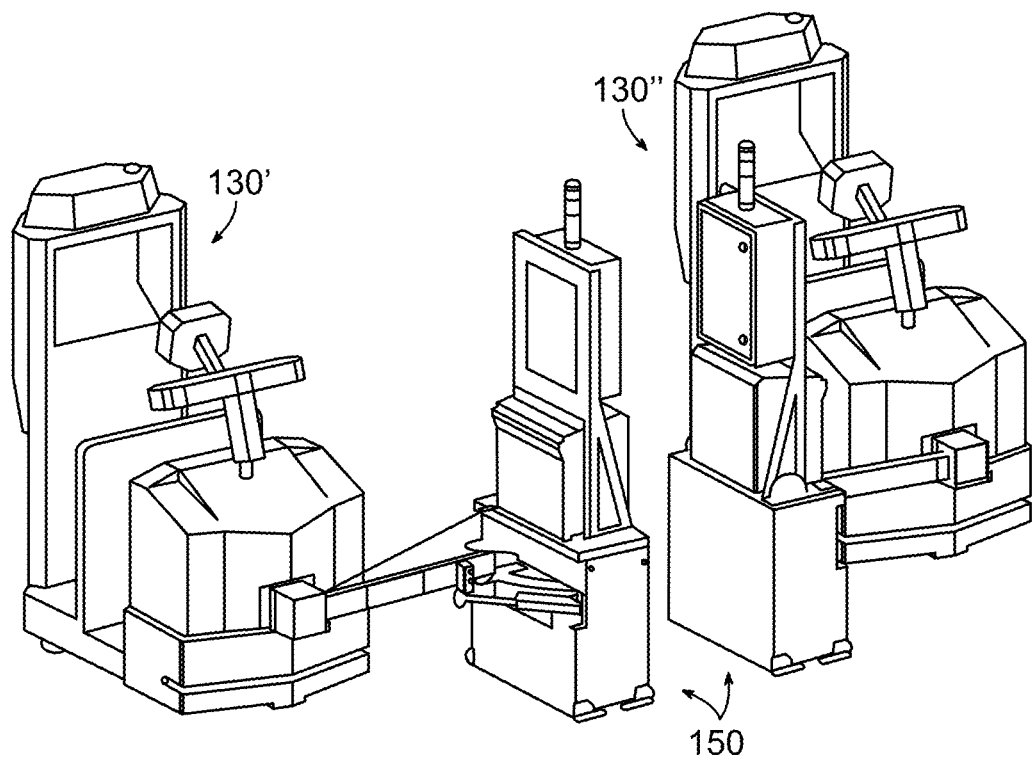
FIG. 11 shows a view of a double drive-thru charging station, in accordance with aspects of the inventive concepts.

FIG. 11 shows a view of a double drive-thru charging station, in accordance with aspects of the inventive concepts. In this embodiments, two charging stations 150' and 150" are located back-to-back to simultaneously charge two different vehicles 130' and 103".

Figure 12A:
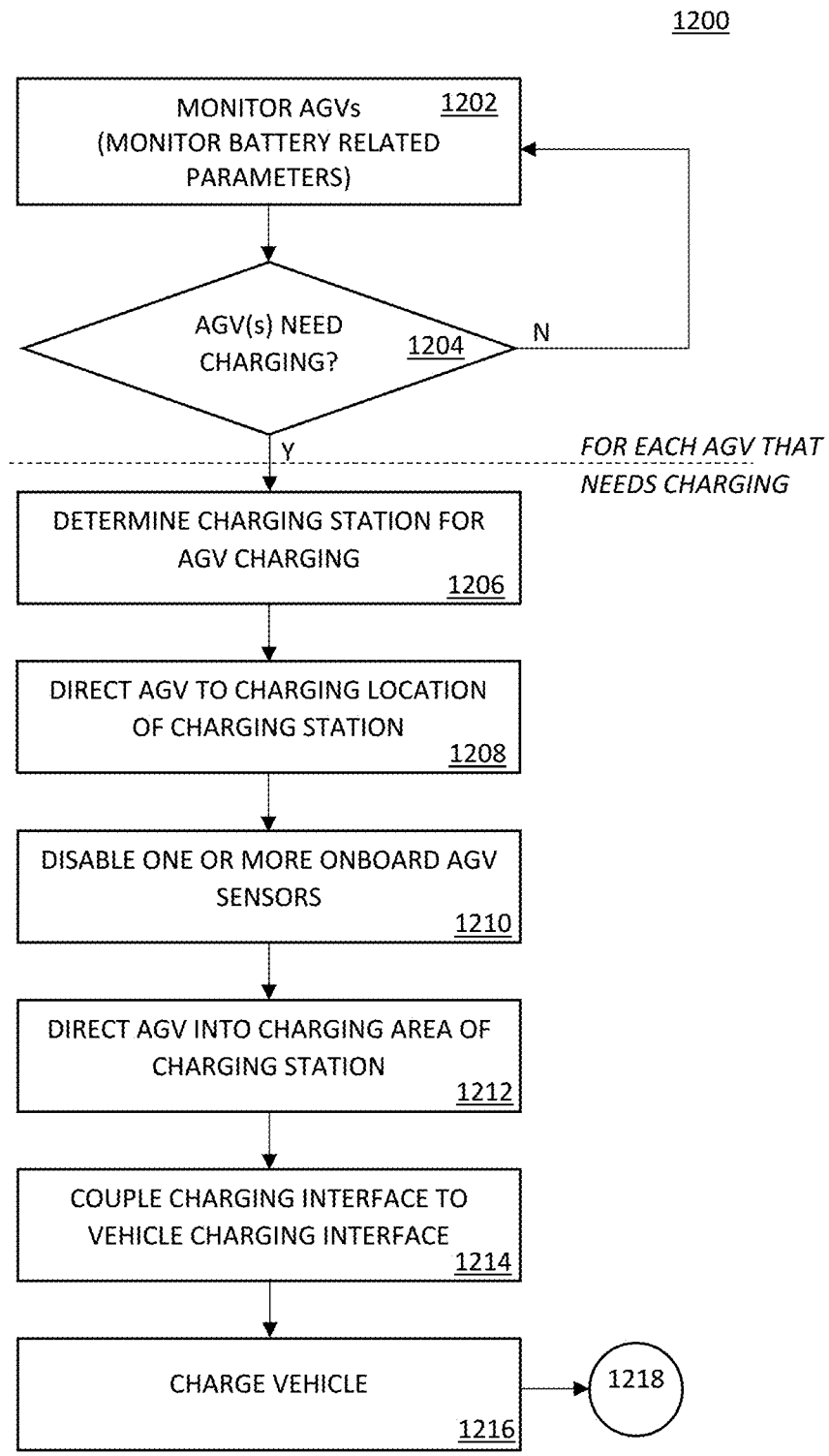
FIGS. 12A and 12B are a flowchart of a charging method using at least one charging station, in accordance with aspects of the inventive concepts.
Figure 12B:
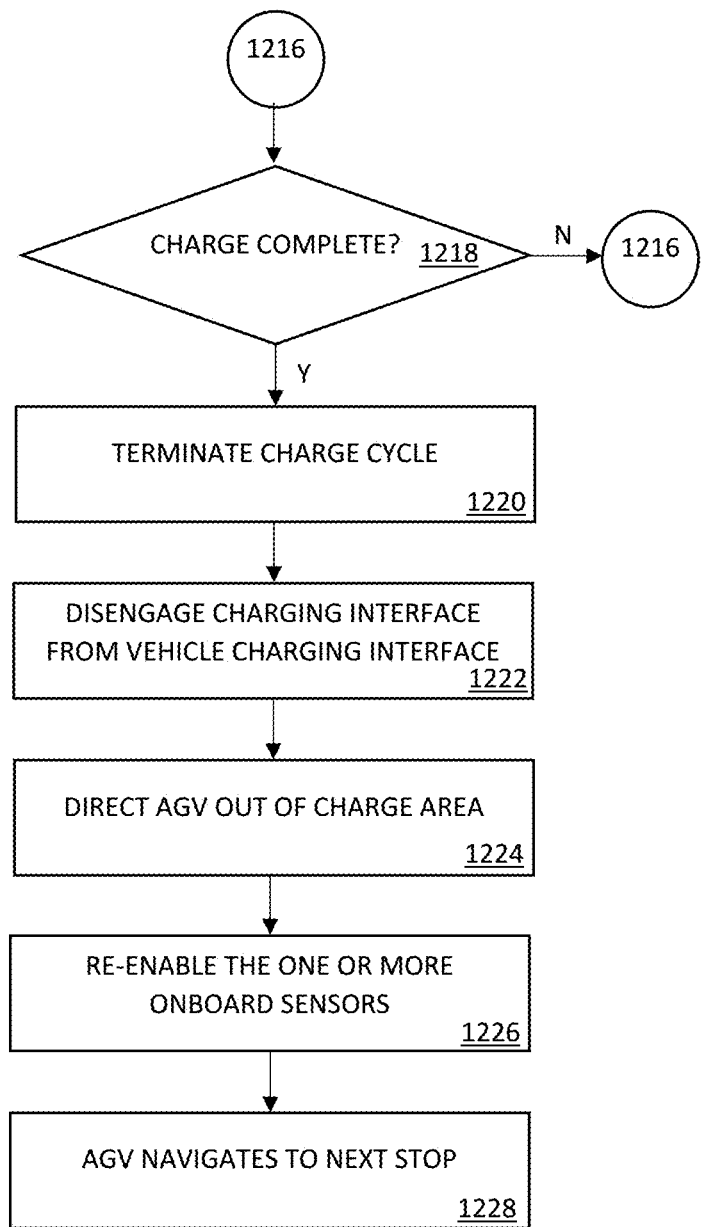

FIGS. 12A and 12B are a flowchart of a charging method 1200 using at least one charging station 150, in accordance with aspects of the inventive concepts. In a first step 1202, the vehicle (or AGV) and/or a managements system 140 monitor the charge level of the AGV. In step 1204, if it is determined that the vehicle needs a charge, then a charging station is determined for charging the vehicle 130, in step 1206. The vehicle 130 or management system 140 can have knowledge of location of all charging stations in the environment and chose one that is available and within driving range of the vehicle 130, preferably along the vehicle's route, or at least close to the route.

The vehicle 130 navigates to the determined charging station in step 1208. In some embodiments, in step 1210, the vehicle 130 will disable one or more object detection sensors so that the presence of the charging station 150 does not impede or interfere with the vehicle's ability to proceed to a charging position and/or location near the charging station 150. In step 1212, the vehicle 130 navigates into a charging area proximate the charging station 150. In step 1214, the charging interface 154 of the charging station 150 engages with the charging interface 134 of the vehicle 130, including enabling charging interface magnets 158, which engage the vehicle interface, and then delivering power through the charger contacts 156.

In step 1216, charging of the vehicle commences and is monitored by the charger 170. In step 1218, if it is determined that the charge is complete, e.g., the charger 170 determines the battery of the vehicle is fully charged, the charge cycle is terminated in step 1220. If in step 1218 it is determined that the battery of the vehicle is not fully charged, the charge cycle continues in step 1216.

In step 1222, the charge interface of the charging station 150 terminates power through the charger contacts 156 and disables its magnets 158 and the charging station charging interface 154 is disengaged from the vehicle charging interface 134. In step 1224, the vehicle 150 is directed away from the charging station 150, whether a drive-in charger or a drive-thru charger. In step 1226, if vehicle sensors were disabled in step 1210, those sensors can be re-enabled. In step 1228, the vehicle 130 navigates to its next stop.

Figure 13:
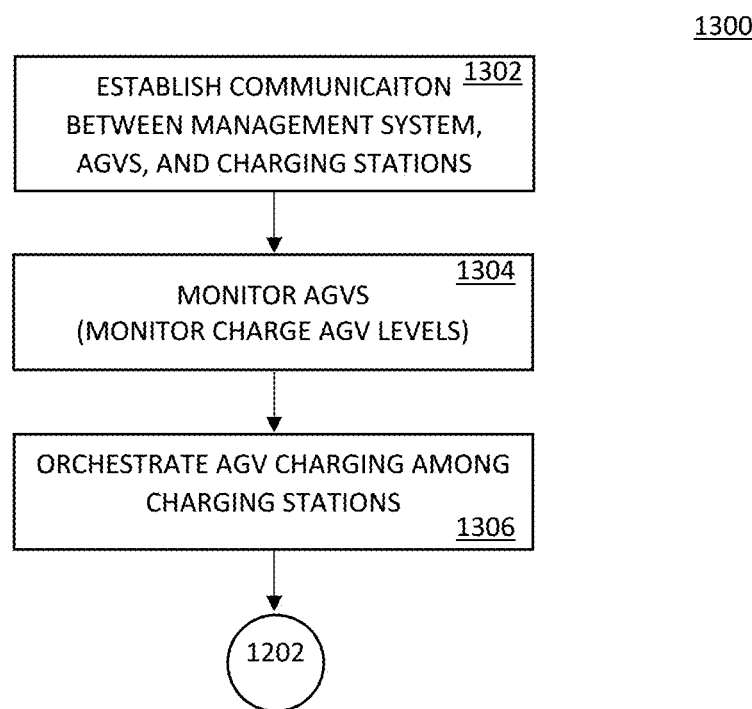
FIG. 13 is a flow diagram of an embodiment of a method of orchestrating charging of a plurality of AGV by a management system, in accordance with aspects of the inventive concepts.

FIG. 13 is a flow diagram of an embodiment of a method 1300 of orchestrating charging of a plurality of vehicles, e.g., AGVs, by a management system 140, in accordance with aspects of the inventive concepts. In this embodiment, the management system 140 establishes and/or participates in communication with a plurality of vehicles 130 and charging stations 150 within the environment. In step 1304, the management system 140 monitors charge levels of the vehicles and determines when one or more of the vehicles needs charging. The management system 140 can also monitor status and availability of the charging stations and orchestrate and/or coordinate charging of the vehicles at the charging stations. Preferably the orchestration maximizes efficiency of the vehicles. To achieve the charging, the method 1300 can utilize the method 1200 for the vehicles to be charged. The orchestrating can include utilizing artificial intelligence and machine learning to model vehicle battery usage patterns, charging station availability, vehicle routes, congestion and other factors of the environment to learn how to optimize the use of charging stations with minimal disruption to the workload of the vehicles.

Figure 14A:
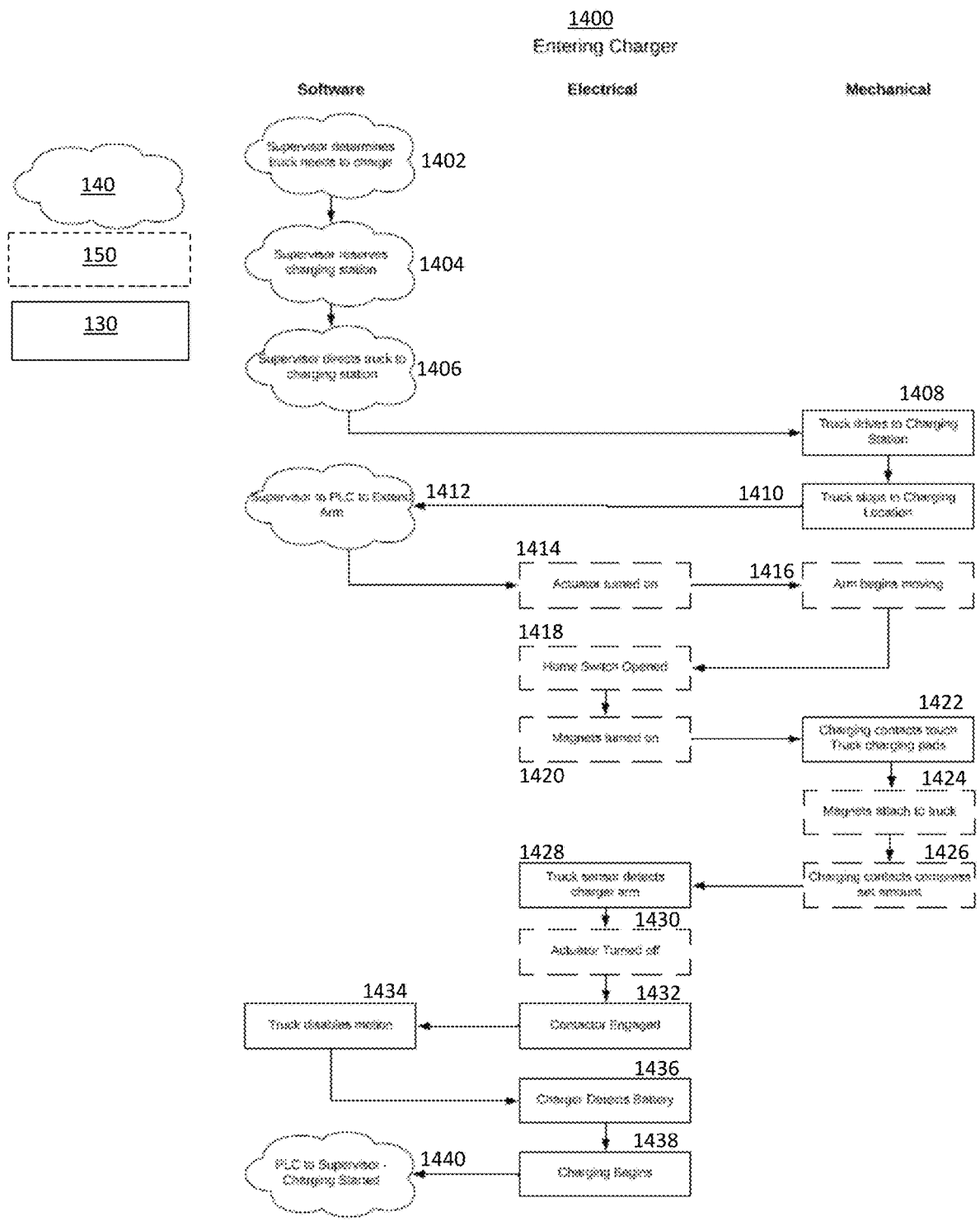
FIG. 14A is a flow diagram of an embodiment of a method of a vehicle entering a charging station, in accordance with aspects of the inventive concepts.

FIG. 14A is a flow diagram of an embodiment of a method 1400 of a vehicle 130 entering a charging station 150, in accordance with aspects of the inventive concepts. The various steps in FIG. 14A can be carried out by the management systems ("Supervisor"), vehicle 130, and charging station 150, each having its own shape in the figures. The shape associated with a step indicates the entity performing the step, in this embodiment. As used herein, PLC refers to the controller 160 of the charging system 150. In this embodiment, the steps are organized in to the components that perform them, i.e., Software, Electrical, and Mechanical.

In step 1402, the management system 140 determines a vehicle 130 needs a charge. In step 1404, the management system 140 reserves a charging station 150. In step 1406, the management system 140 directs the vehicle 130 to the charging station 150.

In step 1408, the vehicle 130 drives to the charging station. In step 1410, the vehicle stops at the charging station. In step 1412, the management system directs the controller 160 to extend the arm 152 of the charging station 150. In step 1414, the actuator 159 turns on and, in step 1416, the arm 152 beings moving from the non-charging position to the charging position.

In step 1418, once the arm reaches its charging position, a home switch is opened. In step 1420, the magnets 158 of the charging interface 154 of the arm 152 are turned on. In step 1422, the charger contacts 156 contact the charger contacts (or charging pads) 136 of the vehicle 130. In step 1424, the magnets attached to the vehicle interface 134, to draw the charging interface 154 of the charging station and the charging interface 136 of the vehicle 130 in secure engagement and contact. In step 1426, the charging contacts 156 compress a predetermined amount. In step 1428, a vehicle sensor detects the engaged charging interface 154 (attached to the charger arm 152), via the vehicle charging interface 134. The actuator 159 that moves the arm 152 turns off in step 1430, since the arm is in charging position.

In step 1432, a contactor of the vehicle is engaged, which is switch connected between the battery and the charging interface 134 of the vehicle to enable the charging operation. The contactor completes the charging circuit within the vehicle once full engagement of the charging station interface 154 of the charging station and the charging interface 134 of the vehicle. And in step 1434 the vehicle's drive system is disabled or the vehicle is otherwise disabled from motion. In step 1436, the charger 170 detects the battery of the vehicle 130. In step 1438, charging by the charger 170 is started. The controller 160 of the charging station 150 can communicate the commencement of charging to the management system 140. The charging continues until the charger 170 determines that the battery of the vehicle is charged.

Figure 14B:
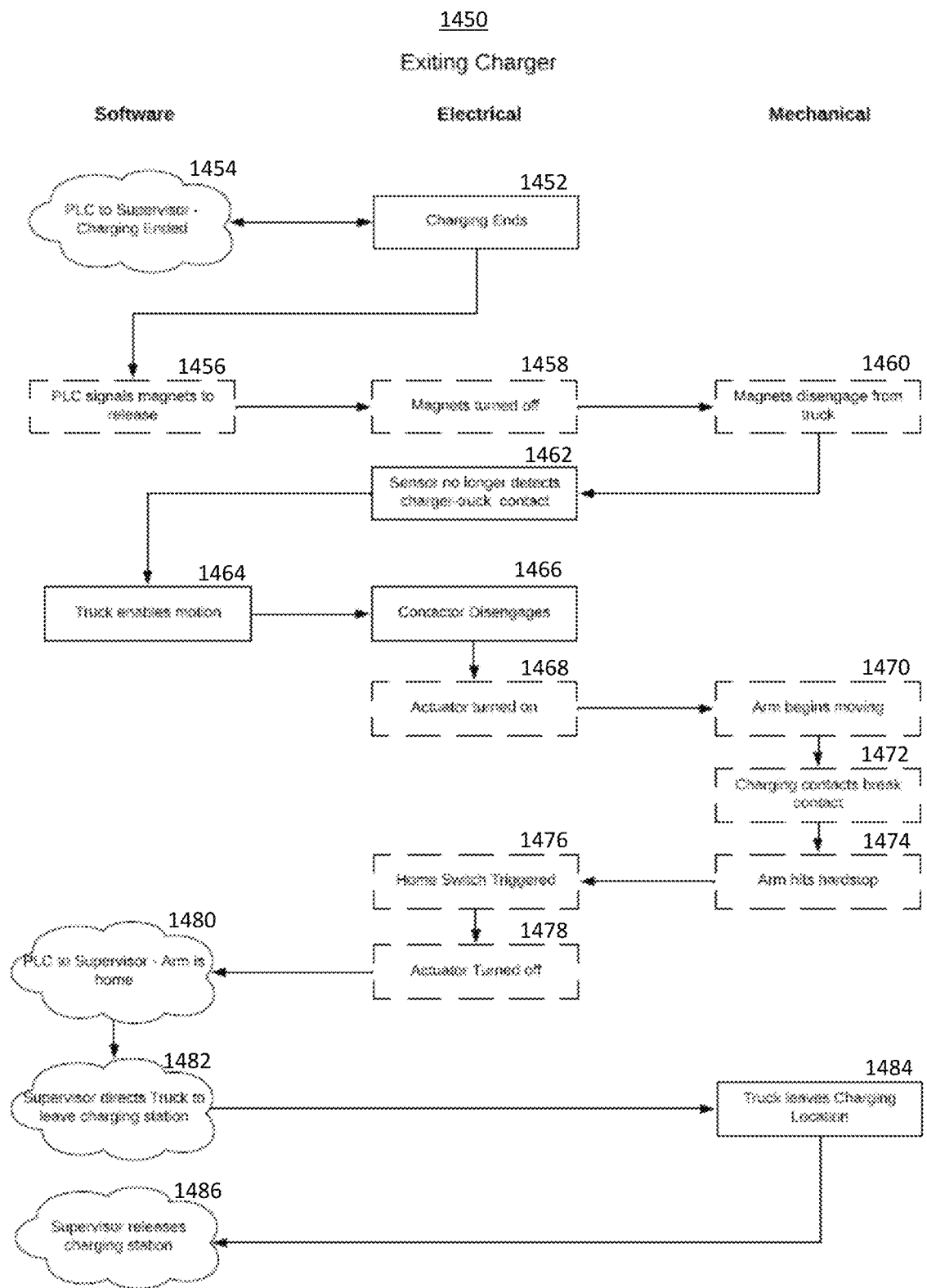
FIG. 14B is a flow diagram of an embodiment of a method of a vehicle exiting a charging station, in accordance with aspects of the inventive concepts.

FIG. 14B is a flow diagram of an embodiment of a method 1450 of a vehicle entering a charging station, in accordance with aspects of the inventive concepts. The various steps in FIG. 14B can be carried out by the management systems ("Supervisor"), vehicle 130, and charging station 150, each having its own shape in the figures. The shape associated with a step indicates the entity performing the step, in this embodiment. As used herein, PLC refers to the controller 160 of the charging system 150. In this embodiment, the steps are organized in to the components that perform them, i.e., Software, Electrical, and Mechanical.

In step 1452, the charging ends. In step 1454, the controller 160 communicates to the management system 140 that the charging of the vehicle 130 has ended. In step 1456, the controller 160 signals the magnets 158 to release. In step 1458, the magnets are turned off and, in step 1460, the magnets of the charging interface 154 disengage from the charging interface 134 of the vehicle 130.

In step 1462, the sensor of the charging interface 134 no longer detects the charge contact with the vehicle. In step 1464, the vehicle enables its motion, e.g., turns on or otherwise engages its drive system. In step 1466, the contactor of the vehicle charging interface 134 disengages. In step 1468, the actuator 159 of the charging station 150 is turned on by the controller 160. In step 1470, the actuator 159 begins to move the arm from the charging position to the non-charging position. In step 1472, the charging contacts between the charging station charging contacts 156 and the vehicles charging pads 136.

In step 1474, the arm 152 hits a hard stop at the charging station 150, in its home, non-charging position. In step 1476, the home switch is triggered, indicating that the arm is returned to its home position. In step 1478, the actuator 159 is turned off to stop movement of the arm 152.

In step 1480, the controller 160 communicates to the management system 140 that the arm is returned to its home position. Therefore, in a drive-thru charging station, the arm no longer obstructs the travel path of the vehicle. The management system 140 directs the vehicle 130 to leave the charging station 150. In step 1484, the vehicle leaves the charging stations, e.g., back away from or pulls through. In step 1486, the management system 140 releases the charging station, making the charging station available for a next charging operation.

Figure 15:
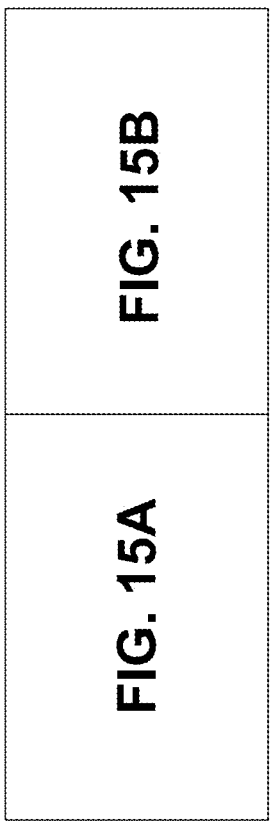
FIGS. 15, 15A, and 15B is diagram of an embodiment of an auto-charging system, in accordance with aspects of the inventive concepts.
Figure 15A:
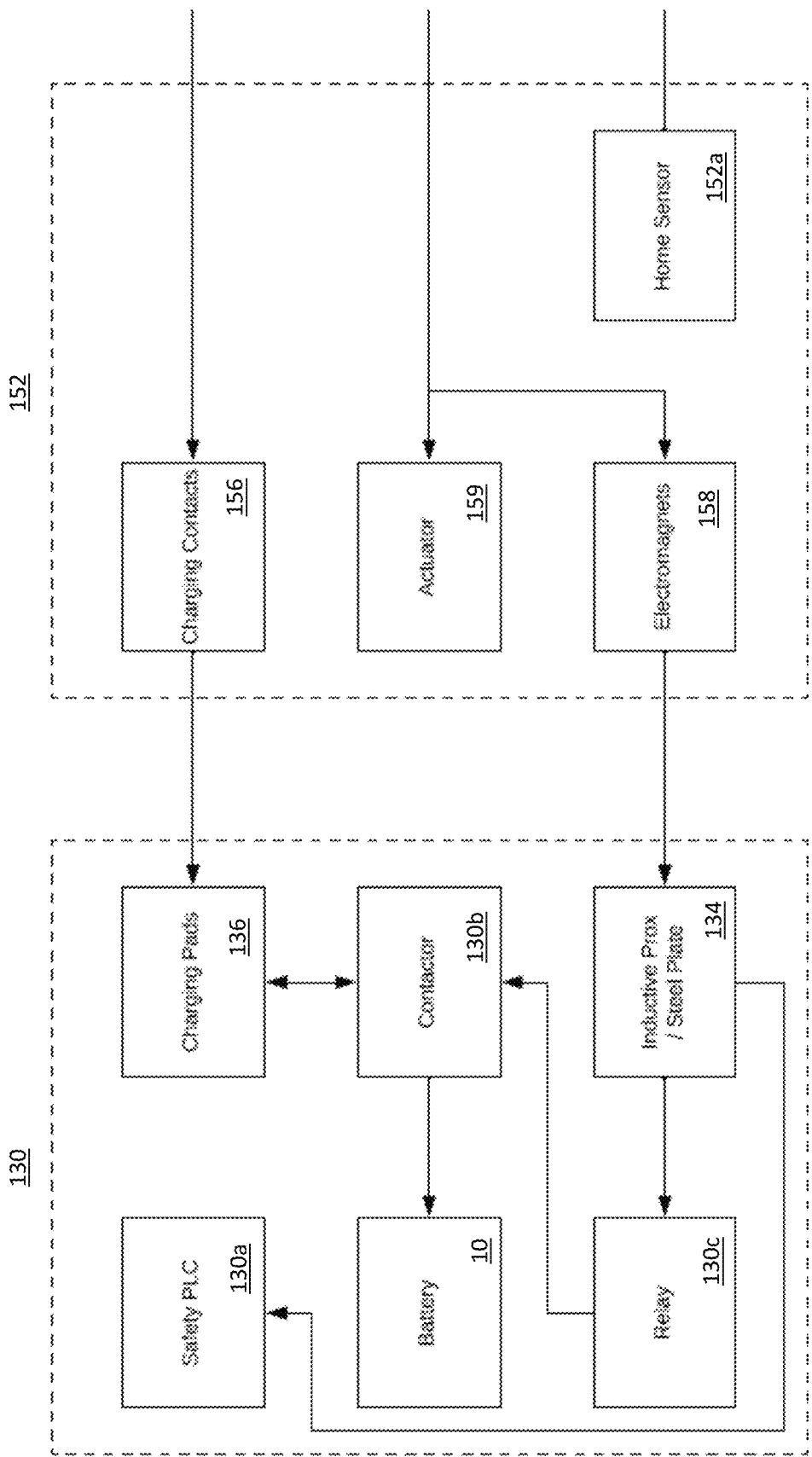
Figure 15B:
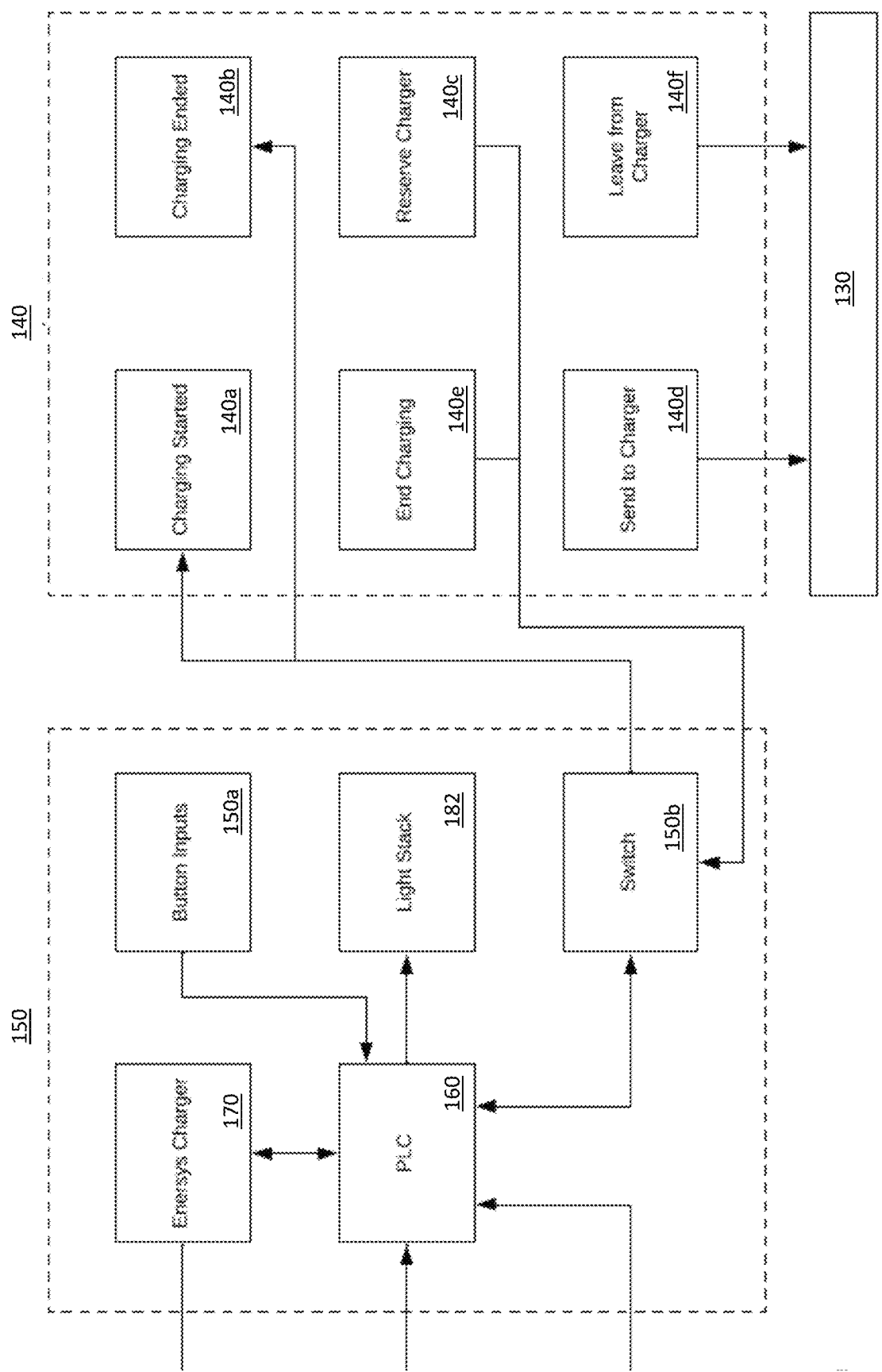

FIG. 15, which is formed by FIGS. 15A, and 15B, is diagram of an embodiment of an auto-charging system, in accordance with aspects of the inventive concepts. FIG. 15 depicts various components of the vehicle 130, arm 152, charging station 150 and management system 140. In other embodiments, the various components could be distributed differently, and some could be omitted.

Vehicle 130 includes a safety programmable logic controller 130*a*, a battery 10 (to be charged), a contactor 130*b*, a relay 130*c*, charging pads 136, and an inductive proximity sensing steel plate 134.

Arm 152 of the charging station 150 includes charging contacts 156, actuator 159, electromagnets 158, and a home sensor 152*a*.

Charging station 150 includes, the controller 160 (e.g., a programmable logic controller), the charger 170, the light stack 182, various user control mechanisms 150*a*, and a kill switch 150*b*.

Management system 140 interfaces with the charging station 150 and the vehicle 130. The management system can process various messages related to the charging operation, including: charging started 140*a*, charging ended 140*b*, reserve charging station 140*c*, send (vehicle) to charger 140*d*, end charging 140*e*, and leave charger 140*f*.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. An autonomous vehicle, comprising:
    a charging interface configured to be coupled to a charging interface of a charging station;
    one or more sensor configured to detect a presence of an object in a path of the vehicle; and
    a controller configured to disable the one or more sensor when the vehicle is near a charging station to perform a charging task, so that the presence of the charging station does not impede or interfere with the vehicle's ability to proceed to a charging position near the charging station,
    wherein the one or more sensor includes at least one sensor configured to generate a stop field such that if an object is detected by the one or more sensor in the stop field the vehicle is stopped, and
    wherein the controller configured to disable the stop field near the charging station.

2. The vehicle of claim 1, wherein the charging interface comprises at least one charger contact.

3. The vehicle of claim 2, wherein the at least one charger contact is positioned at a front of the vehicle.

4. The vehicle of claim 1, wherein the one or more sensor includes at least one sensor configured to generate at least one downwardly projecting scan planes.

5. The vehicle of claim 1, wherein the one or more sensor includes at least one sensor configured to generate at least one horizontal scan plane.

6. The vehicle of claim 5, wherein the charging interface is located above the one or more sensor.

7. The vehicle of claim 1, wherein the one or more sensor is disabled by the controller when the charging station is detected.

8. The vehicle of claim 1, wherein the controller is configured to direct the vehicle to navigate out of the charging area in response to a charge complete indication.

9. The vehicle of claim 8, wherein the controller is further configured to enable the disabled one or more sensor in response to the charge complete indication.

10. A method of charging an autonomous vehicle, comprising:
    providing an autonomous vehicle comprising a charging interface and one or more object detection sensors monitored and controlled by a controller;
    auto-navigating the vehicle to a charging station in response to a charging task;
    disabling the one or more object detection sensor in response to sensing the vehicle is near the charging station;
    generating a stop field by at least one sensor from the one or more object detection sensor such that if an object is detected by the one or more object detection sensor in the stop field the vehicle is stopped and disabling the stop field near the charging station; and
    navigating proximate the charging station to commence a charging operation via the charging interface.

11. The method of claim 10, wherein the charging interface comprises at least one charger contact.

12. The method of claim 11, wherein the at least one charger contact is positioned at a front center of the vehicle.

13. The method of claim 10, including generating at least one downwardly projecting scan plane by at least one sensor from the one or more object detection sensor.

14. The method of claim 10, including generating at least one horizontal scan plane by at least one sensor from the one or more object detection sensor.

15. The method of claim 14, wherein the charging interface is located above the one or more object detection sensor.

16. The method of claim 10, including disabling the one or more object detection sensor by the controller in response to detecting the charging station.

17. The method of claim 10, further comprising the controller directing the vehicle to navigate out of the charging area in response to a charge complete indication.

18. The method of claim 17, further comprising the controller enabling the disabled one or more object detection sensor in response to the charge complete indication.

* * * * *